(12) United States Patent
Willis et al.

(10) Patent No.: US 10,299,466 B2
(45) Date of Patent: *May 28, 2019

(54) ELECTRONICALLY-CONTROLLED WATER FLOW REGULATOR SYSTEM FOR POULTRY DRINKER LINES

(71) Applicant: Lubing Systems, L.P., Cleveland, TN (US)

(72) Inventors: Charles Willis, Cleveland, TN (US); Shawn Willis, Cleveland, TN (US); Dustin Hicks, Georgetown, TN (US); Chris Hawk, Chattanooga, TN (US)

(73) Assignee: Lubing Systems, L.P., Cleveland, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,851

(22) Filed: Mar. 27, 2017

(65) Prior Publication Data

US 2017/0196204 A1    Jul. 13, 2017

Related U.S. Application Data

(63) Continuation-in-part of application No. 14/498,885, filed on Sep. 26, 2014, now Pat. No. 9,603,343.

(Continued)

(51) Int. Cl.
*G05D 7/06* (2006.01)
*F16K 31/04* (2006.01)
(Continued)

(52) U.S. Cl.
CPC .......... *A01K 39/0213* (2013.01); *A01K 39/02* (2013.01); *F16K 31/04* (2013.01);
(Continued)

(58) Field of Classification Search
CPC .. A01K 39/02; A01K 39/0213; G05D 16/202; G05D 7/0635; Y10T 137/87772;
(Continued)

(56) References Cited

U.S. PATENT DOCUMENTS 2,706,966 A  *  4/1955  Cline ..................... A01K 39/02
119/74
5,072,749 A  *  12/1991 Ligh ..................... F17C 13/025
137/116.5

(Continued)

*Primary Examiner* — Jessica Cahill
(74) *Attorney, Agent, or Firm* — Todd Partners, P.C.; Jack D. Todd

(57) ABSTRACT

An electrically-controlled water flow regulator for use with a poultry watering system receives potable water at a first, high flow rate and reduces the water flow rate of the water provided to watering valves that dispense water to the flock within a poultry house. A variable control valve uses a needle-shaped cone to engage a mating port inside the housing of the regulator. A motor controls the linear movement of the control valve in incremental steps to adjust the water flow rate provided to the flock. A feedback component enables the variable control valve to maintain the water flow rate at a desired set point for the flock. The desired set point for the flock is controlled or automated to match the growth of the flock over their growth cycle. An electrical controller and suitable cabling enable multiple regulators to be controlled efficiently and cost-effectively.

20 Claims, 13 Drawing Sheets

Related U.S. Application Data

(60) Provisional application No. 61/882,979, filed on Sep. 26, 2013.

(51) Int. Cl.
 *G05D 16/20* (2006.01)
 *A01K 39/02* (2006.01)

(52) U.S. Cl.
 CPC ....... *G05D 7/0635* (2013.01); *G05D 16/2013* (2013.01); *Y10T 137/87772* (2015.04)

(58) Field of Classification Search
 CPC ......... Y10T 137/87096; Y10T 137/877; Y10T 137/7832
 USPC .......................................... 137/506
 See application file for complete search history.

(56) References Cited

U.S. PATENT DOCUMENTS

| | | | | |
|---|---|---|---|---|
| 5,429,072 A | * | 7/1995 | Schumacher | A01K 7/02 119/72 |
| 5,870,970 A | * | 2/1999 | Katz | A01K 39/0213 119/72 |
| 5,967,167 A | * | 10/1999 | Johnson | A01K 39/02 119/72 |
| 6,240,956 B1 | * | 6/2001 | Johnson | G05D 16/0605 119/72.5 |
| 6,253,708 B1 | * | 7/2001 | Johnson | A01K 39/02 119/72 |
| 6,776,180 B1 | * | 8/2004 | Yonnet | G05D 16/2093 137/14 |
| 7,219,689 B2 | * | 5/2007 | Pollock | G05D 16/0655 137/495 |
| 8,056,509 B1 | * | 11/2011 | Hostetler | A01K 39/0213 119/72 |
| 2003/0111019 A1 | * | 6/2003 | Pollock | A01K 39/0213 119/72 |
| 2009/0235869 A1 | * | 9/2009 | Nardine, III | A01K 1/031 119/72 |
| 2012/0285390 A1 | * | 11/2012 | Katz | A01K 39/0213 119/72 |

\* cited by examiner

ELECTRONICALLY-CONTROLLED WATER FLOW REGULATOR SYSTEM FOR POULTRY DRINKER LINES

CROSS REFERENCE TO RELATED APPLICATION

This application is a continuation-in-part (CIP) of and claims priority benefit under 35 U.S.C. § 120 to U.S. patent application Ser. No. 14/498,885, filed Sep. 26, 2014, now U.S. Pat. No. 9,603,343, issued Mar. 28, 2017, entitled "Electronic Pressure Regulator System for Poultry Drinker Lines," which claims priority benefit under 35 U.S.C. § 119(e) to U.S. Provisional Patent Application No. 61/882,979, entitled "Electronic Pressure Regulator System for Poultry Drinker Lines," filed Sep. 26, 2013, both of which are hereby incorporated by reference in their entirety as if set forth in full herein.

FIELD OF THE INVENTION

The present invention relates generally to poultry watering systems and, more particularly, to an improved, electronically-controlled water flow and pressure regulator, related controllers, processes, ancillary components, and equipment used to monitor and regulate the flow of water in a poultry drinker system and to strategically adjust the same in an automated fashion during the growth stages of the flock.

BACKGROUND OF THE INVENTION

Poultry watering systems include a series of connected water dispensing lines, a plurality of interconnected valves connected to one or more low pressure water supply lines, fed by one or more potable water sources. The potable water supply is typically provided to a poultry house or broiler house ("facility") at a pressure much greater than the intended or necessary operating pressure of the watering valves and at a much greater pressure and flow than is desired at each drinker nipple accessible to the poultry. This demands that a water flow and pressure regulator be provided as part of the watering system to ensure that the watering valves are supplied with water at a pressure and flow rate within the operating parameters of the valves and at a desired pressure and flow rate at the drinker nipples used by the flock to obtain water. Furthermore, it is often required that the operating pressure and flow rate for the watering valves be varied throughout the growth period of the poultry flock to allow for the greatest efficiency of use of water by the flock. In other words, the flock needs increasingly more water as the chicks continue to grow, but it is undesirable to provide too much water to the chicks at any point during their growth cycle because it not only wastes water but can cause excess water to be released during drinking, which, in turn, causes excess water to spill to the floor which combines with spilled food and poultry droppings to create a mess on the floor of the poultry house.

Conventionally, controlling the flow of water and water pressure to a poultry watering system is handled manually by an operator in the facility. However, manual operation and adjustment of the water flow and pressure regulators used to control the water supply to the poultry drinker lines is not efficient and can lead to over or under watering of the flock at any given time. Hydraulic air pressure control systems have been developed, but these systems tend to be expensive and difficult to install. For these and many other reasons, there is a need in the industry to be able to vary the operating flow and pressure of the water supply provided to the poultry watering valves remotely, efficiently, and inexpensively. It is also desirable to be able to retrofit existing watering systems with minimal effort and at low cost.

It would be advantageous to be able to control the water flow and pressure supplied to poultry drinker systems automatically through use of an electrically-controlled variable position water control valve or by electrically-controlling diaphragm pressure within a regulator valve without the need for installing air pressure hydraulic lines or components and to eliminate the need for a facility operator to have to manually adjust the water flow and pressure at each regulator in the facility. Preferably, it would be desirable for such water flow and pressure adjusting systems to be controlled either (i) with feedback from an electrical water flow and pressure feedback device—in the form of a closed-loop system, or (ii) without a feedback device—in the form of an open-loop system. Preferably, either of these control configurations would be commanded through the use of one or more manual user interfaces and/or through an electronic interface designed to adapt to standard voltage or current analog control loops.

It would also be advantageous to have an electronic assembly that is designed to be interconnected with other assemblies within a specified range, such as within a 500 meter range, to simplify the control and power installation requirements. It would also be advantageous to have an electronic assembly that can provide a unified control of a plurality of (up to 100 or more) devices. Preferably, it would also be desirable if installation of any necessary electrical wiring can be handled by any conventional electrician using readily-available pre-wired cabling, as long as such cabling is designed specifically to withstand the harsh environment of a broiler house.

There is a further need for a controllable water flow and pressure regulator capable of measuring actual water flow or pressure against a desired water flow or pressure set point and making adjustments as needed and on an on-going or regular basis. Preferably, both the actual water flow or pressure and the desired set point would be continuously-monitored. There is yet a further need for a proportional-integral-derivative (PID) control algorithm configured to adjust the controllable valve to meter the flow of water in the drinker line/system. There is also a need for an embedded microprocessor/controller to adjust the position of the control valve proportionally to maintain the actual water flow or pressure in the line as closely as possible to the desired set point in response to changes to either the flow or pressure set point or actual flow or pressure measurements.

Although a "facility" has been described above and will generally be used interchangeably herein to refer to a poultry house or broiler house, it will be understood by those of skill in the art that any facility that waters animals being grown or raised, particularly for consumption, and that requires water flow or pressure regulators to control or limit the water supplied directly to the animals as compared to the water flow or pressure coming into the facility can make effective use of the systems, techniques, technologies, devices, and processes described herein. Such facilities include, but are not limited to, poultry breeder houses, turkey broiler or breeding houses, and poultry pullet or egg laying houses.

The present invention meets one or more of the above-referenced needs as described herein below in greater detail.

SUMMARY OF THE INVENTION

The present invention relates generally to poultry drinker systems and, more particularly, to systems, processes, and devices used for an improved, electronic water flow and pressure regulator, related controllers, and equipment used to control the water flow in a poultry watering system.

In a first aspect of the invention, a water flow regulator for use with a poultry watering system is used to provide potable water to a flock of poultry over their growth cycle, the water flow regulator comprising: (i) a main housing that defines an interior chamber; (ii) an input disposed on the main housing and connected to a water supply line, the water supply line providing potable water to the main housing at a first pressure, the input including a metering valve disposed within the interior chamber; (iii) an output disposed on the main housing and connected to a dispensing line, the dispensing line having a plurality of watering valves configured to supply the potable water to the flock of poultry at a desired flow rate, the desired flow rate optimized to provide a predetermined amount of potable water to the flock through the plurality of watering valves; (iv) a variable control valve mounted onto the housing and extending into the interior chamber of the housing, the variable control valve positioned to control the flow of potable water into the interior chamber of the main housing and correspondingly through the output, the variable control valve having a needle-shaped cone adapted to engage a mating port within the interior chamber of the main housing and configured to move linearly and incrementally between a fully-closed position and a fully-open position within the metering valve, the variable control valve having a motor that controls the linear and incremental movement of the needle-shaped cone to vary flow rate of the potable water into the interior chamber of the main housing, the motor is in electronic communication with and controlled by a controller board, the controller board being programmed with the desired flow rate for potable water passing through the output to the dispensing lines; and (v) a feedback component connected to the main housing, the feedback component configured to provide a feedback signal back to the controller board, the feedback signal corresponding to the actual flow rate of potable water in the dispensing line, wherein a comparator component of the controller board receives the feedback signal, determines the actual flow rate of potable water in the dispensing line based on the received feedback signal, and actuates the motor to move the needle-shaped cone linearly and incrementally in the direction necessary to cause the actual flow rate of potable water in the dispensing line to move toward the desired flow rate programmed on the controller board.

In a feature, the controller board increases the desired flow rate for potable water passing through the output to the dispensing lines over the growth cycle of the flock of poultry. In another feature, the motor controls the linear and incremental movement of the needle-shaped cone by rotating a threaded rod connected thereto. In a further feature, the threaded rod maintains its position and the position of the needle-shaped cone within the metering valve until receiving a signal from the controller board to move. In yet a further feature, the comparator component actuates the motor to move the needle-shaped cone linearly and incrementally at predetermined time intervals. In a further feature, by varying the flow rate of the potable water into the interior chamber of the main housing, the variable control valve adjusts the potable water within the interior chamber of the main housing to a second pressure and, correspondingly, adjusts the actual flow rate of potable water passing through the output to the dispensing lines. In one embodiment, the feedback component includes a removable tube that is connected to the main housing and receives potable water from the interior chamber. Preferably, the feedback component includes a circuit board mounted adjacent the tube, the tube maintaining a column of water having a height, wherein the height of the water column corresponds to the second pressure and wherein the height of the water column is detected by detecting a magnet floating on top of the water column using a plurality of Hall effect sensors mounted along a length of the circuit board. Alternatively, the feedback component includes a circuit board mounted adjacent the tube, the tube maintaining a column of water having a height, wherein the height of the water column corresponds to the second pressure and wherein the height of the water column is detected using a series of capacitive sensors mounted along a length of the circuit board. In another embodiment, the feedback component includes a removable pressure transducer mounted to the housing that detects the second pressure and generates the feedback signal as a function of the second pressure.

In a second aspect of the invention, a water flow regulator for use with a poultry watering system used to provide potable water to a flock of poultry over their growth cycle, the water flow regulator comprises: (i) a main housing that defines an interior chamber; (ii) an input disposed on the main housing and connected to a water supply line, the water supply line providing potable water to the main housing at an input pressure, the input including a metering valve disposed within the interior chamber; (iii) an output disposed on the main housing and connected to a dispensing line, the dispensing line having a plurality of watering valves configured to supply the potable water to the flock of poultry at a desired flow rate, the desired flow rate optimized to provide a predetermined amount of potable water to the flock through the plurality of watering valves; (iv) a variable control valve mounted onto the housing and extending into the interior chamber of the housing, the variable control valve positioned to control the flow of potable water into the interior chamber of the main housing and through the output, the variable control valve being in electronic communication with and controlled by a controller board; and (v) a feedback component mounted onto the main housing, the feedback component configured to detect an actual output pressure of potable water within the interior chamber and to provide a feedback signal to the controller board, wherein the controller board is programmed with the desired flow rate, the controller board includes a comparator component that receives the feedback signal, determines an actual flow rate of potable water in the dispensing line as a function of the received feedback signal, and actuates the variable control valve to move incrementally between a fully-closed position and a fully-open position within the metering valve as necessary to cause the actual flow rate of potable water in the dispensing line to move toward the desired flow rate programmed on the controller board.

In a feature, the controller board increases the desired flow rate for potable water passing through the output to the dispensing lines over the growth cycle of the flock of poultry. In another feature, the variable control valve includes a needle-shaped cone adapted to engage a mating port within the interior chamber of the main housing and is configured to move linearly between the fully-closed position and the fully-open position within the metering valve, the variable control valve having a motor that controls the linear and incremental movement of the needle-shaped cone to vary flow rate of the potable water into the interior chamber and the corresponding actual output pressure of potable water within the interior chamber. In yet a further feature, the motor controls the linear and incremental movement of the needle-shaped cone by rotating a threaded rod connected thereto. Preferably, the threaded rod maintains its position and the position of the needle-shaped cone within the metering valve until receiving a signal from the controller board to move. In another feature, the comparator component actuates the motor to move the needle-shaped cone linearly and incrementally at predetermined time intervals. In yet a further feature, the feedback component includes a removable pressure transducer mounted to the housing that detects the second pressure and generates the feedback signal as a function of the second pressure. In another feature, the feedback component includes a removable tube that is connected to the main housing and receives potable water from the interior chamber. In one embodiment, the feedback component includes a circuit board mounted adjacent the tube, the tube maintaining a column of water having a height, wherein the height of the water column corresponds to the actual output pressure and wherein the height of the water column is detected by detecting a magnet floating on top of the water column using a plurality of Hall effect sensors mounted along a length of the circuit board. In another embodiment, the feedback component includes a circuit board mounted adjacent the tube, the tube maintaining a column of water having a height, wherein the height of the water column corresponds to the actual output pressure and wherein the height of the water column is detected using a series of capacitive sensors mounted along a length of the circuit board.

The aspects of the invention also encompasses a computer-readable medium having computer-executable instructions for performing methods of the present invention, and computer networks and other systems that implement the methods of the present invention. The above features as well as additional features and aspects of the present invention are disclosed herein and will become apparent from the following description of preferred embodiments of the present invention.

This summary is provided to introduce a selection of aspects and concepts in a simplified form that are further described below in the detailed description. This summary is not intended to identify key features or essential features of the claimed subject matter, nor is it intended to be used to limit the scope of the claimed subject matter. The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In addition, further features and benefits of the present technology will be apparent from a detailed description of preferred embodiments thereof taken in conjunction with the following drawings, wherein similar elements are referred to with similar reference numbers, and wherein.

DETAILED DESCRIPTION OF PREFERRED EMBODIMENTS

Figure 1:
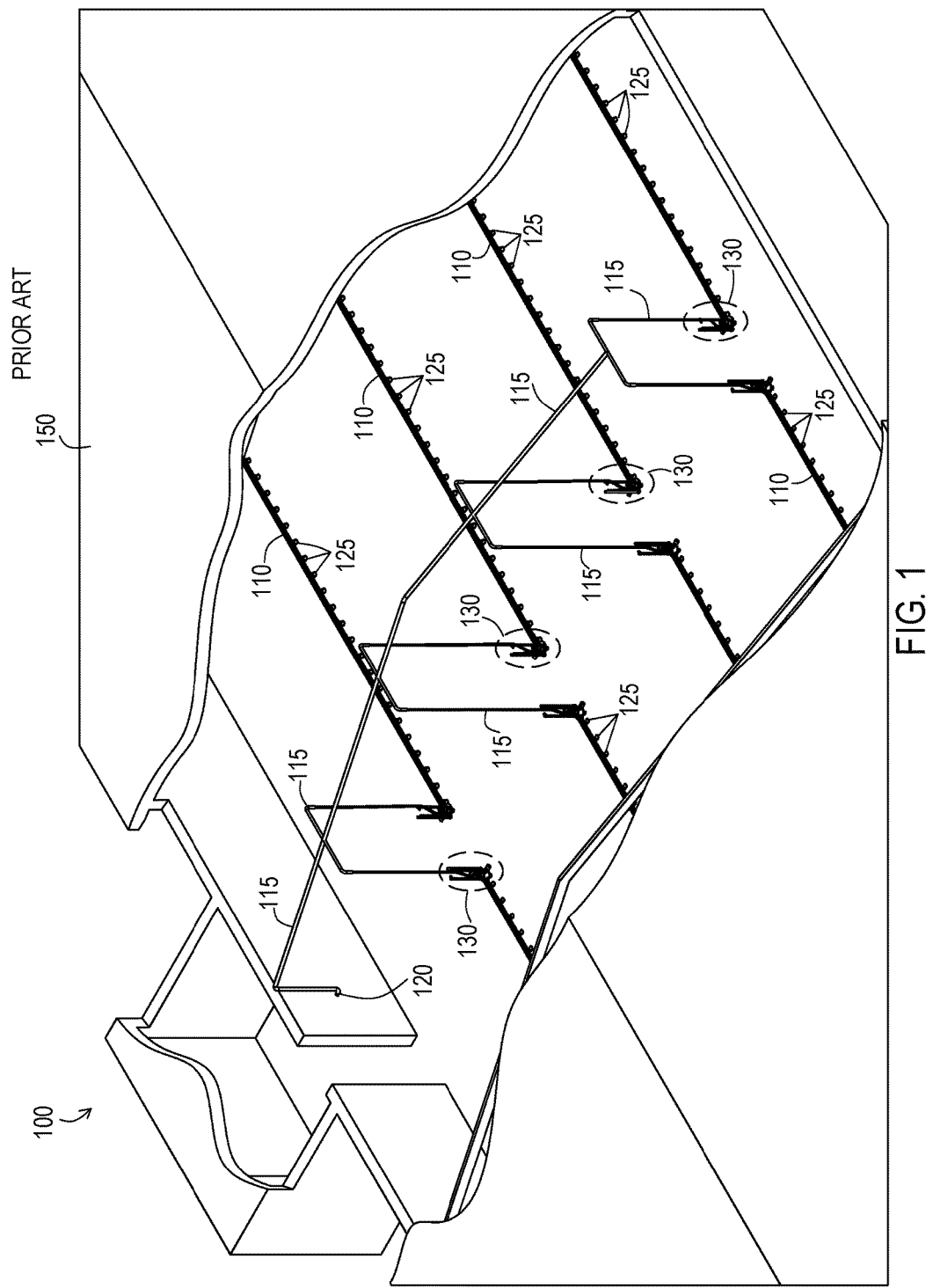
FIG. 1 illustrates a conventional watering system for a broiler house prior to installation of the improvements described herein.

Before the present technologies, systems, devices, apparatuses, and methods are disclosed and described in greater detail hereinafter, it is to be understood that the present technologies, systems, devices, apparatuses, and methods are not limited to particular arrangements, specific components, or particular implementations. It is also to be understood that the terminology used herein is for the purpose of describing particular aspects and embodiments only and is not intended to be limiting.

As used in the specification and the appended claims, the singular forms "a," "an" and "the" include plural referents unless the context clearly dictates otherwise. Similarly, "optional" or "optionally" means that the subsequently described event or circumstance may or may not occur, and the description includes instances where the event or circumstance occurs and instances where it does not.

Throughout the description and claims of this specification, the word "comprise" and variations of the word, such as "comprising" and "comprises," mean "including but not limited to," and is not intended to exclude, for example, other components, integers or steps. "Exemplary" means "an example of" and is not intended to convey an indication of preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference to each various individual and collective combinations and permutations of these can not the explicitly disclosed, each is specifically contemplated and described herein, for all methods and systems. This applies to all aspects of this specification including, but not limited to, steps in disclosed methods. Thus, if there are a variety of additional steps that can be performed it is understood that each of the additional steps can be performed with any specific embodiment or combination of embodiments of the disclosed methods.

As will be appreciated by one skilled in the art, the methods and systems may take the form of an entirely new hardware embodiment, an entirely new software embodiment, or an embodiment combining new software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, non-volatile flash memory, CD-ROMs, optical storage devices, and/or magnetic storage devices.

Embodiments of the methods and systems are described below with reference to block diagrams and flowchart illustrations of methods, systems, apparatuses and computer program products. It will be understood that each block of the block diagrams and flow illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions, and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Poultry Watering System

Turning now to FIG. 1, a conventional poultry watering system 100 typically includes a series of connected water dispensing lines 110 and a plurality of interconnected valves 125 connected to one or more low pressure water supply lines 115, which are fed by one or more potable water sources 120. The source of the potable water supply is typically provided to a poultry house 150 at a pressure much greater than the necessary or desired operating pressure of the watering valves 125. This requires use of a water pressure regulator 130, as part of the watering system 100, to ensure that the watering valves 125 are supplied with water at a pressure within the operating parameters of the valves.

Furthermore, it is often necessary and desirable for the operating pressure and flow rate provided to the watering valves be gradually increased during the growth period of the poultry flock to allow for the greatest efficiency of the use of the water by the flock (i.e., the flock needs more water as the chicks continue to grow but it is undesirable to provide too much water to the chicks at any point during the growing cycle because it wastes water and can create a mess on the floor of the poultry house).

Figure 2:
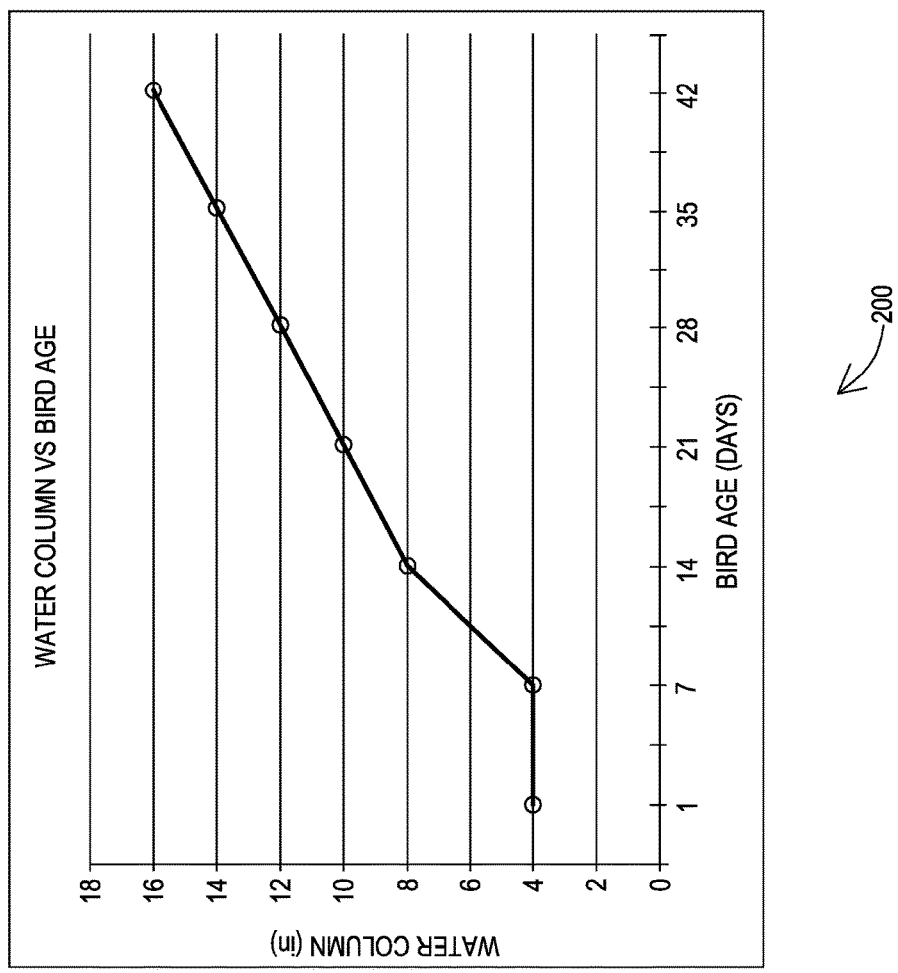
FIG. 2 presents an exemplary graphical representation of the desired water pressure provided to a flock through its growth cycle.

FIG. 2 presents an exemplary graphical representation 200 of the water pressure, which is measured in inches of water column vs. the age of the birds in the flock. These requirements (specific water pressure vs. age of the flock) will actually vary by facility, installation, and the specific goals and needs of the operator of the facility and will not be discussed in detail herein, other than to acknowledge the general necessity for poultry houses to manage water flow and pressure (typically, by gradually increasing the same) throughout the growth period of the flock. It will be appreciated by those of skill in the art that adjusting the water pressure and flow during the life cycle of a flock is necessary whether one operates a conventional watering system 100, as shown in FIG. 1, or whether one operates an improved watering system that is initially built having (or retrofit with) electrically-controlled water pressure/flow regulators and corresponding control system(s), according to the teachings described in greater detail herein.

Figure 3:
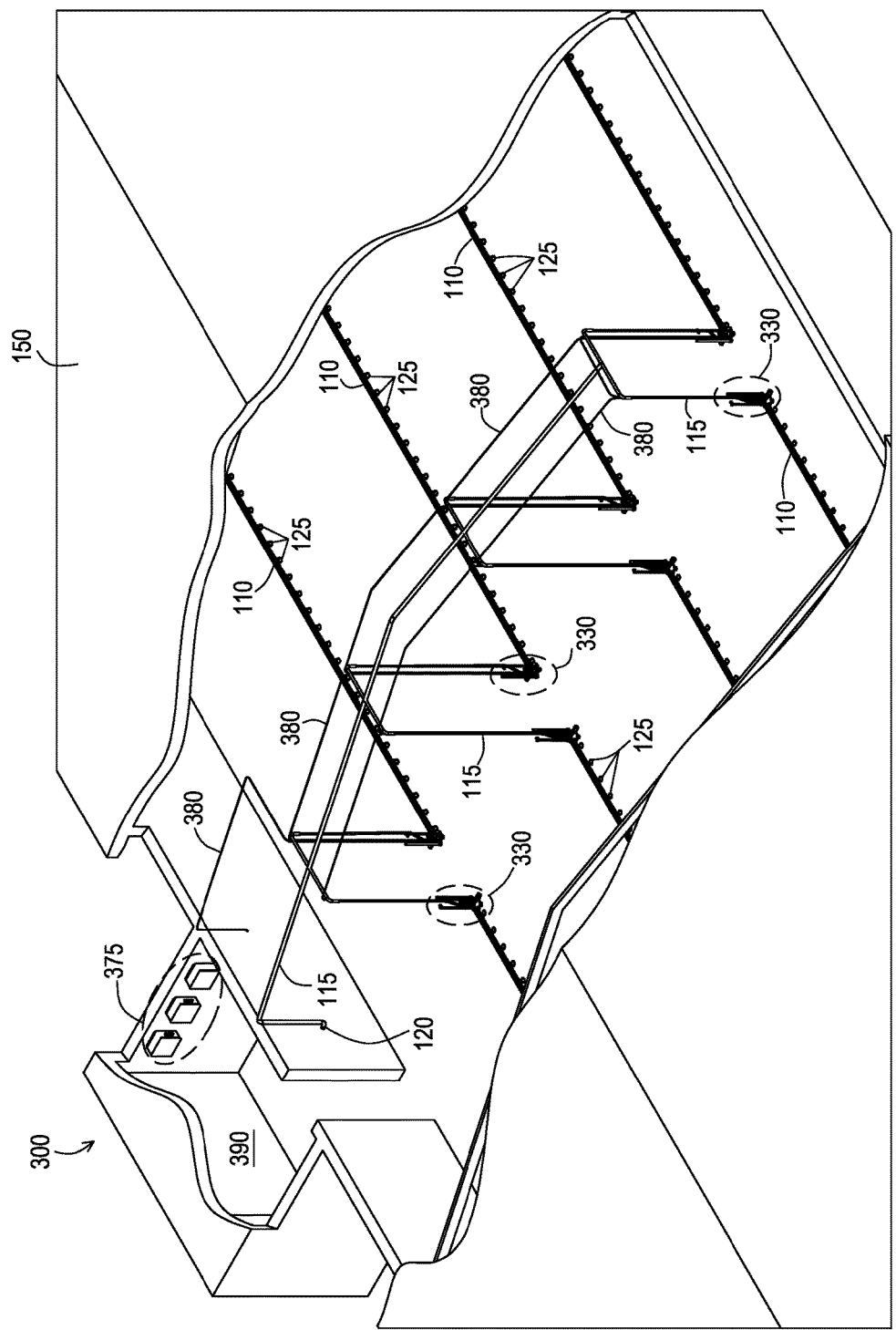
FIG. 3 illustrates a watering system for a broiler house after installation of the improvements described herein.

Turning now to FIG. 3, an improved poultry watering system 300 is illustrated, which is essentially the conventional poultry watering system 100 as shown in FIG. 1, but after having been retrofit with electrically-controlled water pressure/flow regulators 330 and an associated control system 375. Like the poultry watering system 100 of FIG. 1, the improved poultry watering system 300 include a series of connected water dispensing lines 110 and a plurality of interconnected valves 125 connected to one or more low pressure water supply lines 115, which are fed by one or more potable water sources 120 at a first flow rate. Preferably, the control system 375 is in electronic communication with the electrically-controlled water pressure/flow regulators 330. In addition, power is preferably supplied to each of the electrically-controlled water pressure/flow regulators 330. As shown in FIG. 3, control wiring and power supply lines, shown running through conduit or cabling 380, run from a control room 390 of the poultry house 150 to each of the electrically-controlled water pressure/flow regulators 330. The conduit or cabling 380 protects the control wiring and power supply lines from exposure to water, dust, and other contaminants and allows the wiring to be used in the harsh environment of a typical poultry house. For convenience, such conduit or cabling 380 can be run, and connected in conventional manner with any of a variety of connectors, along the top of the low pressure water supply lines 115 to keep the control wiring and power supply lines off the floor of the poultry house 150 and otherwise out of the way of the flock, operators, and contaminants. Alternatively, such conduit 380 can be hung or strung from the ceiling of the poultry house 150, but this is less efficient and requires much more wiring than using the existing support structure provided by the low pressure water supply lines 115.

Figure 4:
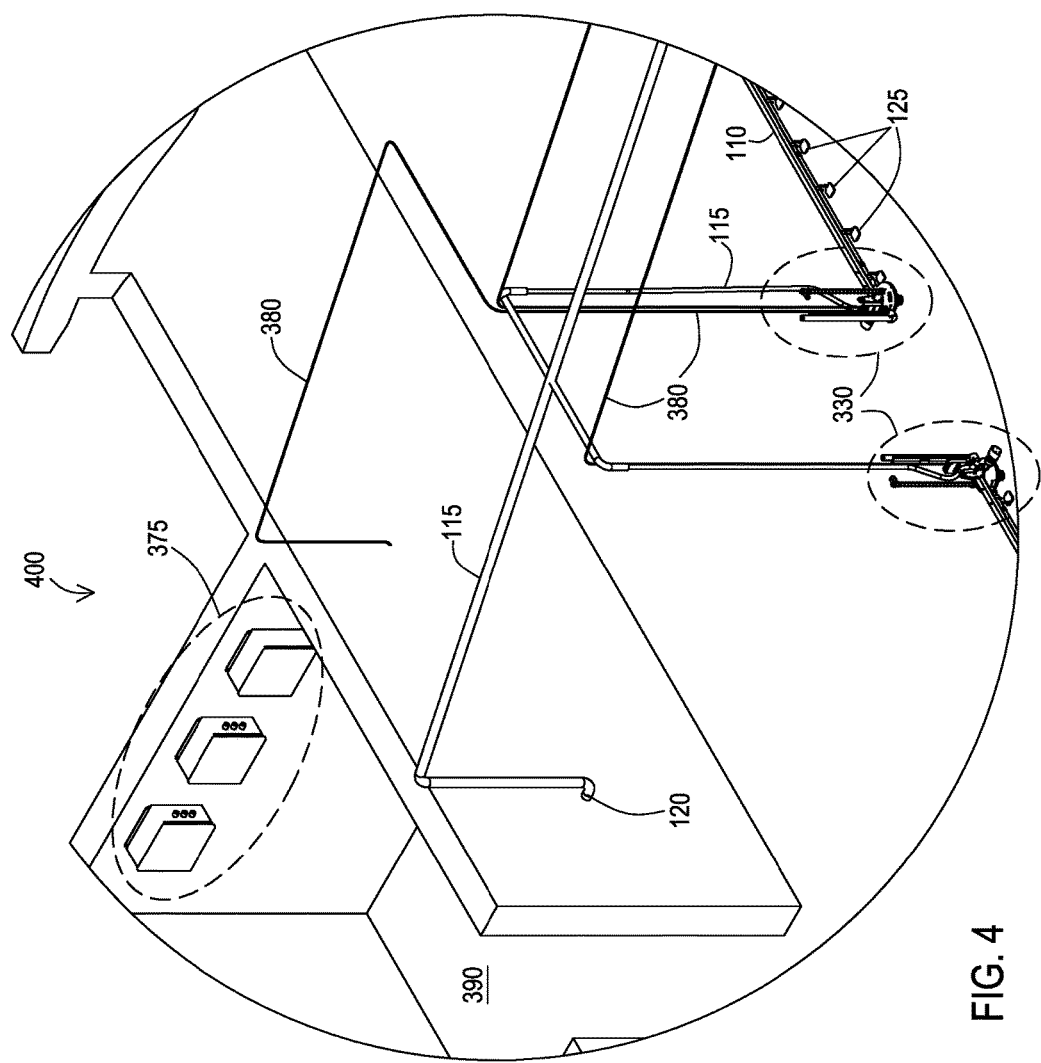
FIG. 4 illustrates a zoomed in view of a portion of the broiler house shown in FIG. 3.

FIG. 4 is merely a zoomed in view 400 of the control room 390 area of FIG. 3. FIG. 4 also provides a zoomed in view of the electrically-controlled water pressure/flow regulators 330 and the associated control system 375.

Figure 5:
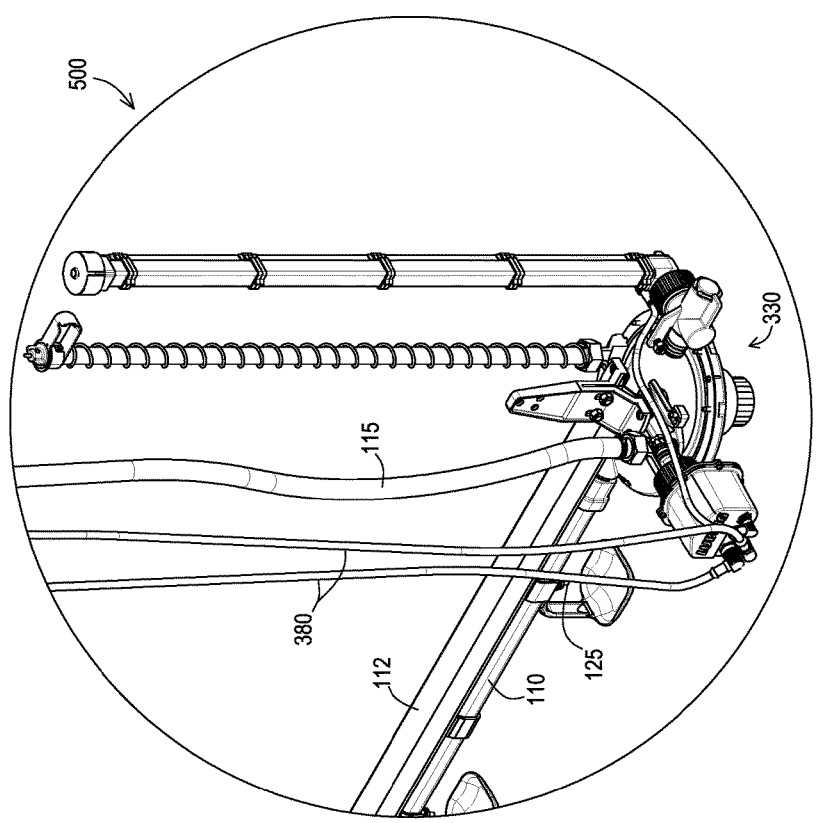
FIG. 5 illustrates a further zoomed in view of one of a plurality of electrically-controlled water pressure regulars as installed in the broiler house of FIG. 3.

FIG. 5 is a zoomed in view 500 of one of the electrically-controlled water pressure/flow regulators 330 mounted as part of the improved poultry watering system 300 from FIG. 3. In this zoomed in view, it is easier to see the water dispensing lines 110 and interconnected valves 125. It is also easier to see the support rod 112 upon which the water dispensing line 110 is preferable hung or attached. Further details and an exploded view of the specific components of the electrically-controlled water pressure/flow regulator 330 will be described in greater detail hereinafter.

As stated previously, since it is often necessary to vary the pressure and water flow of the water supplied to the watering valves 125, it is desirable to be able to adjust or control such pressure and water flow remotely and/or automatically. Methods of doing so, through the use of an electrically controlled variable position valve or by electrically controlling diaphragm pressure, will be described and disclosed in greater detail hereinafter. Preferably, these pressure and water flow adjusting systems can be controlled in two different ways: with feedback from an electrical water pressure/flow feedback device (a closed-loop system) or without a feedback device (an open-loop system). Either of these configurations can be commanded or controlled by a system user through the use of one or more manual user interfaces and/or through an electronic interface designed to adapt to standard voltage or current analog control loops. The electronic assembly is designed to be interconnected with other assemblies, preferably within a 500 meter range, to simplify the control and power systems installation and to offer a unified control of up to, for example, 100 separate regulators 330. Preferably, it is also desirable that installation of any necessary electrical wiring be capable of being done by any conventional electrician using readily-available prewired conduit or cabling 380 that is designed specifically for the harsh environment of a poultry house or poultry raising facility.

The remotely-controlled electrical water pressure/flow regulator 330 provides a convenient means of adjusting water pressure and flow rate within each drinker line 110. Adjusting the pressure and flow rate can be accomplished manually, through use of a simple manual user interface, in conventional manner or automatically, through use of an analog control loop signal from an existing house automation controller to a house automation interface panel in the control room 390. The pressure settings of multiple regulators on a single network can be changed simultaneously, or in virtual groups, to provide a quick and convenient way of changing the water pressure and/or flow rate within one or more drinker lines within a poultry house. Additional functionality of the system enables the water pressure/flow of a single regulator or group of regulators to be controlled, based on a desired or predetermined schedule, which can be set by the user or operator of the poultry house. If an automated scheduler is used, the controller automatically adjusts the water pressure/flow of regulators based on a time table or time line that is set by the scheduler. Likewise, the house automation controller can be wired to one of the analog control loop inputs of the house automation interface panel to automate the control of the water pressure/flow rate of the watering valve drinker lines. Additionally, if using the closed-loop system, the pressure feedback device of the assembly can report actual water line pressure back to the manual user interface and/or to the house automation interface panel to provide a means of monitoring actual water pressure levels in the watering valve drinker lines so that adjustments can be made, if necessary, to modify the pressure and corresponding flow rate to the desired set point.

It is also possible manually to override the position of the variable control valve of individual assemblies to force a full port open flush of the watering valve drinker line. This flushing mode can be initiated at the simple user interface and/or at the house automation controller interface. Preferably, all of these features and functions can be performed without entering the poultry house or otherwise disturbing the flock.

The ease of use, retrofit assembly and installation, adaptability to an automation controller, scheduled water pressure/flow adjustment, simultaneous adjustment of multiple regulators, individual drinker line flush capability, real time monitoring of actual water pressure and/or flow rate, and ability to initiate these control features without entering the poultry house and disturbing the flock, are just some of the many benefits of this system.

Electronic Regulator for Use with Poultry Watering System

Figure 6:
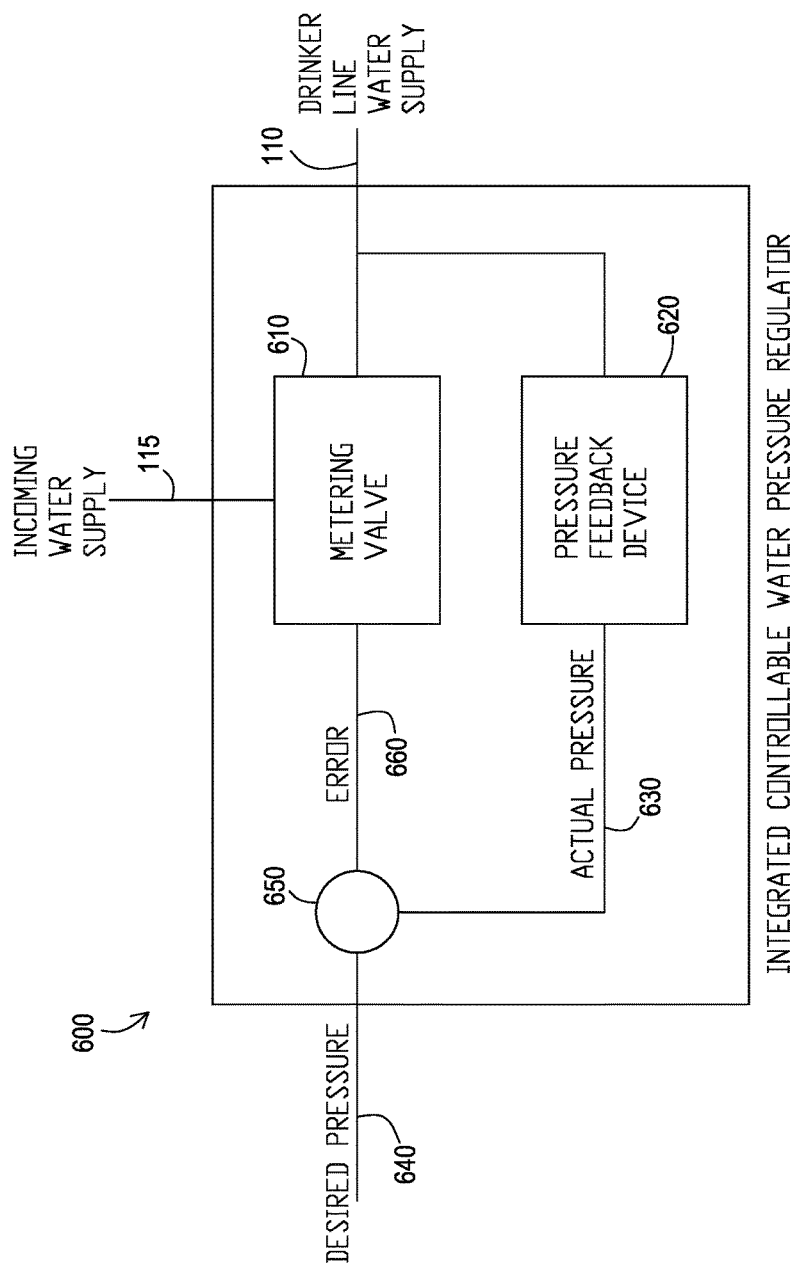
FIG. 6 illustrates a schematic of a feedback loop used to adjust the water pressure provided by one of the electrically-controlled water pressure regulators of FIG. 5.

Preferably, each electrically-controlled or electronically-controlled water pressure/flow regulator 330, as disclosed and described herein, measures actual water pressure/flow rate in the drinker line against a desired control pressure/flow rate set point and makes adjustments to the incoming flow to correct the difference, as needed. FIG. 6 illustrates a simple feedback loop 600 for adjusting and controlling the actual water pressure/flow against a desired water pressure set point. Specifically, incoming water supply comes in on low pressure water supply line 115 to a metering valve 610 that is part of the regulator 330. The output from the metering valve 610 is the drinker line water supply that is provided to the drinker line 110. A pressure feedback device 620 detects the actual pressure of the drinker line water supply and outputs an electronic signal 630 corresponding to such actual pressure. The desired water pressure set point 640, along with the electronic signal 630 corresponding to the actual pressure, is provided to a comparator circuit 650 that determines the difference 660 between the actual pressure 630 and the desired pressure 640 and provides such difference 660 as an error value back to the metering valve 610. The pressure values correlate to actual and desired water flow rate; thus, the desired flow rate can be achieved by monitoring and controlling the actual pressure relative to the desired pressure. Preferably, both the actual water pressure and the desired set point are continuously monitored. Preferably, a proportional-integral-derivative (PID) control algorithm adjusts the controllable pressure regulator valve to meter the flow of water in each drinker line. If changes to either the pressure set point or the actual pressure measurements are detected, an embedded microprocessor adjusts the position of the control valve proportionally to maintain the actual pressure and corresponding flow rate in the drinker line as closely to the set point as possible.

The variable control valve with pressure/flow rate feedback assembly has been designed so that it is possible to retrofit current "manual" versions of the water pressure/flow regulators without permanently modifying the housing of such regulators and while still enabling such regulators to be adjusted or over-ridden manually, if desired. The entire assembly is designed to be installed with a minimal use of tools and without the requirement of any specific knowledge about the operation of the regulator—as either a manual control regulator or as an electrically-controlled regulator. Being a simple retrofit assembly, the design allows for additional cost savings for poultry house operators and/or owners since such regulators can be installed in the field without need of any special tools or equipment. Through use of simple-to-follow guidelines, the entire variable control valve with pressure feedback assembly can typically be retrofit onto an existing, manually-controlled regulator in a matter of minutes.

Figure 7A:
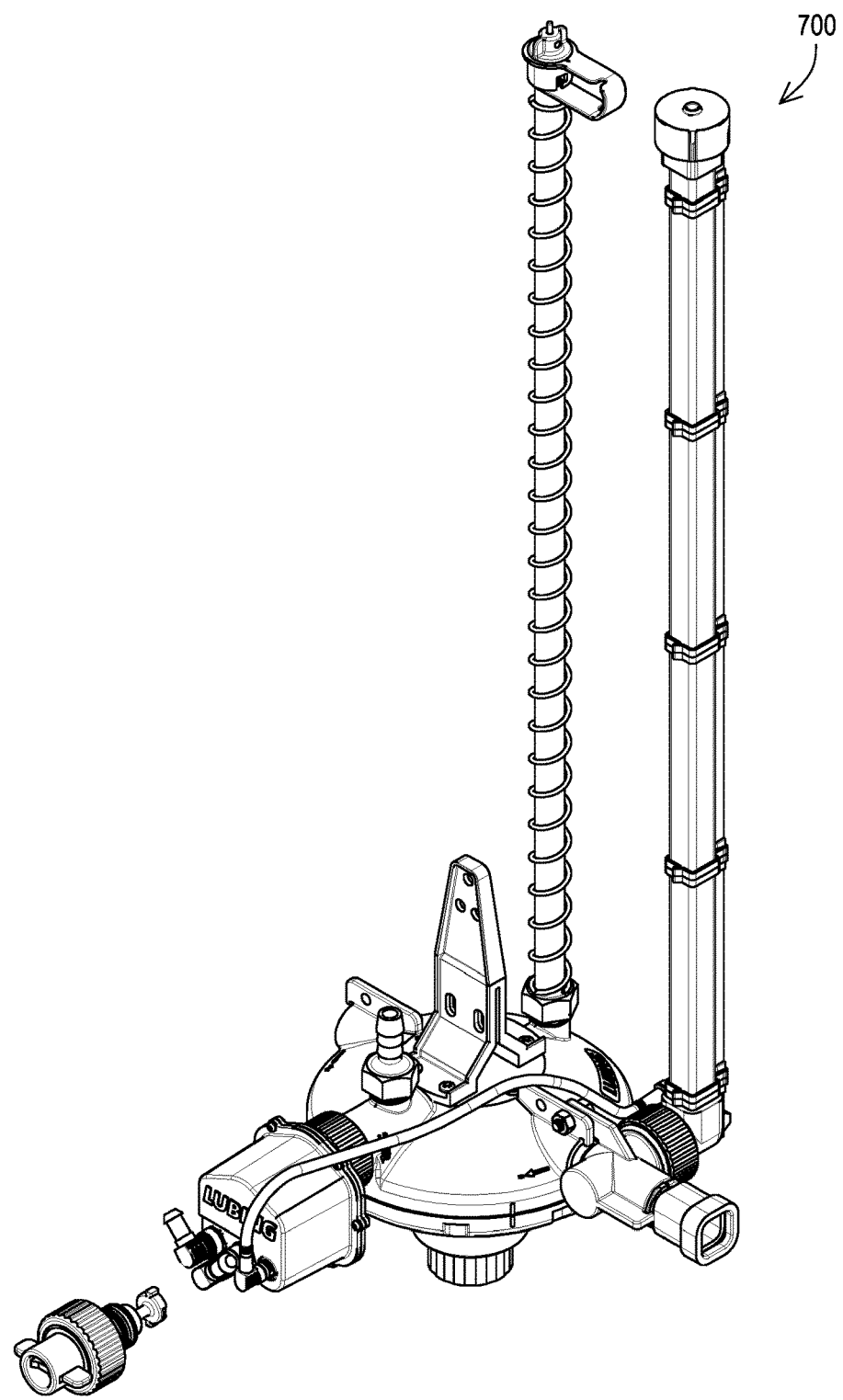
FIGS. 7A and 7B illustrate both a fully-assembled and an exploded view of one of the electrically-controlled water pressure regulators of FIG. 5, which has been retrofit onto a conventional, manually-operated water pressure regulator.
Figure 7B:
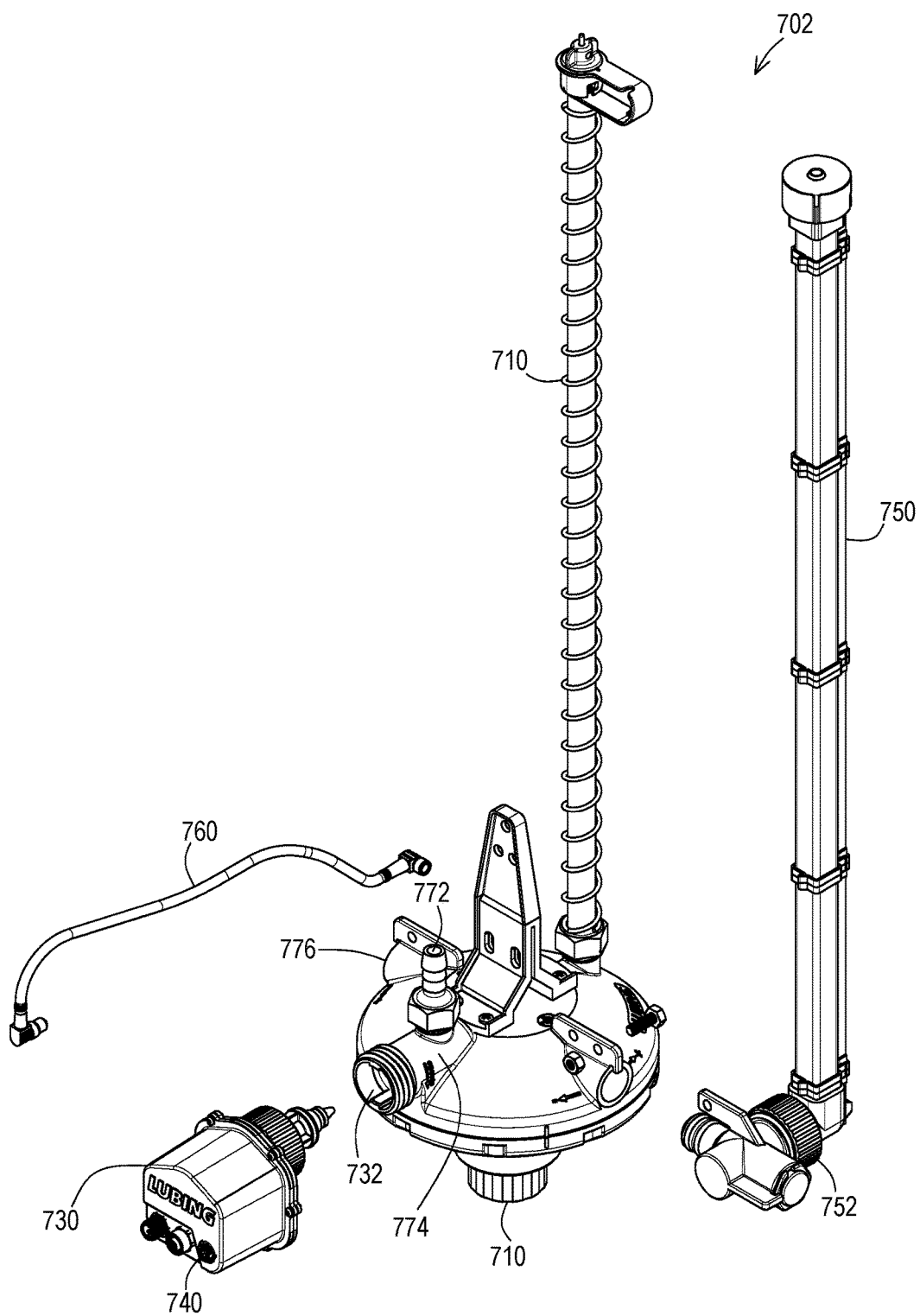

FIGS. 7A and 7B illustrate a retrofit assembly for a regulator 330 of FIG. 3. The regulator 330 is shown in assembled view 700 in FIG. 7A and in an exploded view 702 in FIG. 7B. The core components of a conventional, manually-controlled water pressure regulator assembly 710 are shown. The housing 774 of the regulator assembly 710 defines an interior chamber therein. Further, the housing 774 includes an input 772, which connects with the water control supply line 115 described in FIGS. 3-5. The metering valve 610 described in FIG. 6 is contained within the interior chamber of the housing 774 and controls the flow and pressure of the water from the water control supply line 115 into the interior chamber, in response to the electrically-controlled valve 730, as described in greater detail hereinafter. The electrically-controlled valve 730 mounts into the flush valve assembly port 732 of the regulator assembly 710. A sight tube assembly 750 connects to the regulator assembly 710 and detects the actual water pressure being supplied to the drinker line. A pressure feedback device 752 built into the sight tube assembly 750 is connected to a feedback input 740 on the electrically-controlled valve 730 using an electronic regulator connector or cordset 760, which provides the actual pressure of the drinker line to a built-in comparator circuit in the electrically-controlled valve 730. The housing 774 includes an output 776 to which the dispensing line 110 described in FIGS. 3-5 is connected.

This "ease of installation" concept is further carried over into the electrical installation as well. Each variable control valve with pressure feedback assembly is provided with electrical "quick-disconnect" receptacles to aid in the ease and simplicity of wiring the devices. All of the necessary power and communications are preferably carried over a single cable and distributed with use of readily-available supplied, or alternatively, third party available pre-manufactured cabling systems. Each pre-manufactured cable assembly is mated to a corresponding connector at each variable control valve with pressure feedback assembly, so wiring mistakes are made nearly impossible with a minimum of instructions. The variable control valve with pressure feedback assembly and the pre-manufactured cabling is designed specifically for damp, harsh environments. All electrical connections preferably form an air-tight seal that is capable of withstanding accidental submersion in water and other fluids to ensure a reliable and long-lasting installation.

The simple manual user interface and the optional house automation interface panels are interconnected to the variable control valve with pressure feedback assemblies through this same network of pre-manufactured cabling. Low voltage power is introduced to the system through the simple manual user interface, which requires a connection to a common NEMA 5-15 (or compatible) electrical receptacle. For networks with large numbers of assemblies and/or long network cabling lengths, optional power injectors are available to extend the low voltage electrical supply to these numerous and/or distant assemblies.

Figure 8:
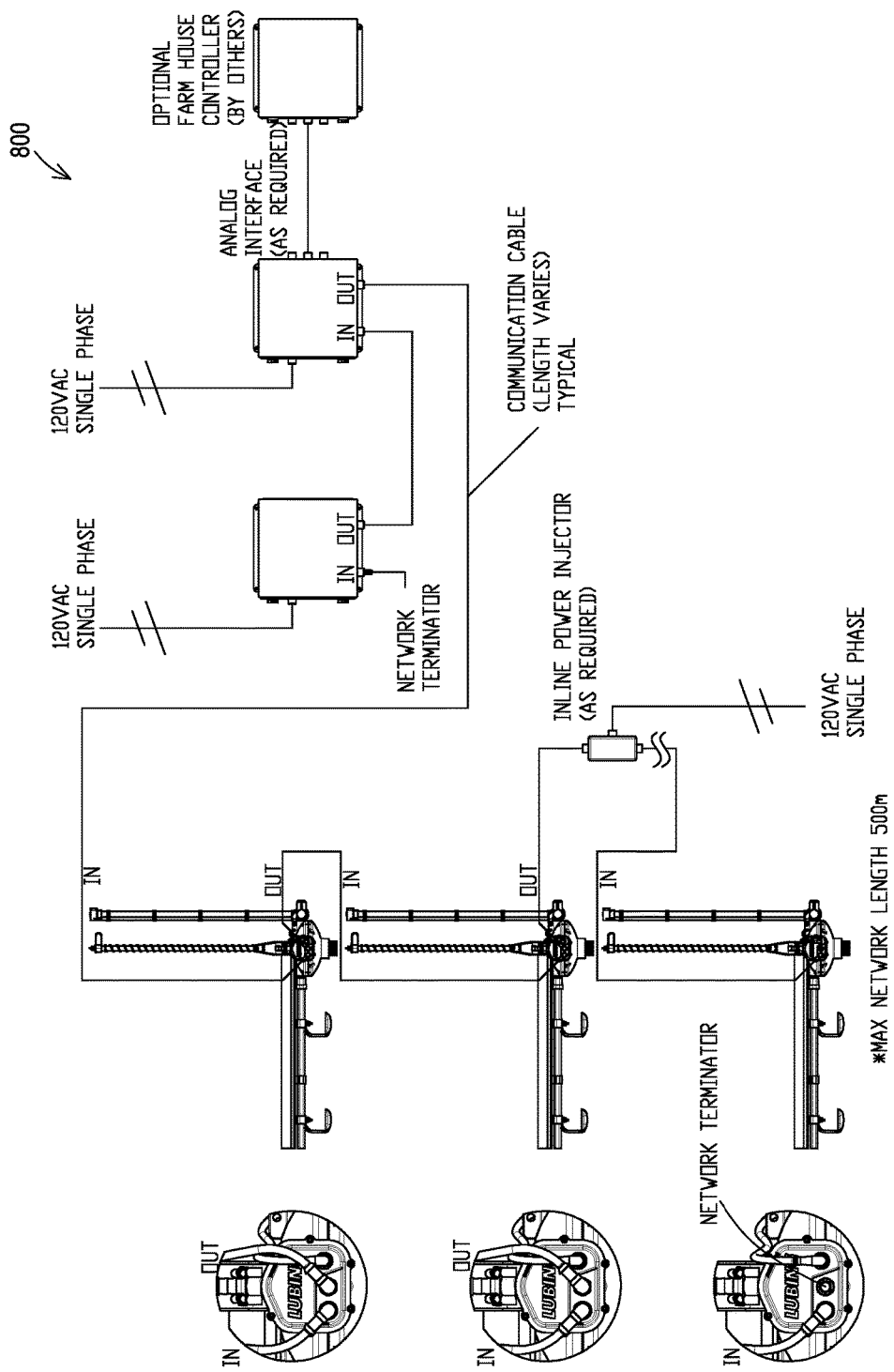
FIG. 8 illustrates a preferred wiring diagram for connecting and controlling components of the broiler house of FIG. 3.

The simple manual user interface and the house automation interface panel are designed for installation in an environmentally-isolated mechanical shed outside of the poultry house or, optionally, available with a sealed control enclosure suitable for mounting in the poultry house environment. FIG. 8 illustrates a wiring diagram 800 for a preferred and typical system installation, as described above.

Embedded Controller System

It was determined that the system preferably needed a microprocessor that (i) was capable of precision position control of a valve mechanism, (ii) could receive and process pressure measurements obtained from an external sensor, (iii) could accept user input for set point control, and (iv) could maintain control of pressure and flow rate based on user set point and actual system pressure using a control algorithm. The microprocessor was designed concurrently with the development of the control valve and the feedback device and was used to test prototype designs as they were developed. This required that either a powerful and capable processor, having a large variety of I/O capabilities, memory, and integrated features, or a processor that offered a simple upgrade path, when the demands exceeded the capacity of the processor, be selected at the beginning of the development process. For these reasons, one of the many available ARM core-based microprocessors was chosen. The ARM core of processors is a widely popular architecture for both hobbyists and professionals, so the tools and the support were abundant. The offerings vary from small and compact with low memory, to powerful processors that power many of today's sophisticated electronics, such as cell phones and home appliances. The design was initially based on selection of a powerful microprocessor, but having a "family" of faster and more capable processors available, if necessary, to ensure an upgrade path with as little software conversion as possible. Initially, it was determined that most of the inputs (signals/data) to the processor (e.g., actual pressure; pressure set point; actuator position; level feedback display, etc.) would be of an analog nature; therefore, a processor with an emphasis on high resolution and large quantity of analog inputs was chosen. An ARM core processor of NXP branding that provided numerous analog inputs and a number of discrete I/O with a reasonable amount of memory and a capable processing speed was finally chosen for this purpose.

Throughout the trials with the valve and the feedback sensor, it became necessary mid-stream during the design phase to change to a processor with fewer analog inputs but with a greater memory capacity. Staying within the same processor family allowed the software and programming that had already been created to migrate easily to the new processor. For initial design and testing, the inventors were able to rely upon "off the shelf" processor development circuit boards. After design of the feedback device and the valve actuator was finalized, it was again determined that the processor needed to be upgraded to one that was faster, one that had more memory, and one having with an integrated CAN bus that enabled a control scheme using digital communications. This transition to an improved processor presented additional design challenges, since several of the peripheral functions were now integrated into the chip. The PWM and the 4 Wire SPI all behaved slightly differently than in previous designs. Along with the change over in processors, several new algorithms were also developed to fine tune the previous test routines that had been written to prove the initial design concepts. It also proved necessary at this time to create a custom processor board.

A development board with an integrated CAN bus was used for initial proof of concept, but the family stepping on the chip of the prototype development board was an older stepping. NXP had released newer versions of the chip to correct several severe flaws with the older stepping, so efforts were focused on designing a new, custom-designed control board using the newer version of the NXP processor. Algorithms specifically written for the newer chip, in particular with the analog input functions, the CAN bus peripherals, and the 4 Wire SPI interface, functioned on the new hardware based on the improved stepping functionality of the newer NXP processor.

Determining an input voltage range was another consideration. Because of the commonality of 24 VDC in Europe, it was felt that European end-users would prefer 24 VDC while end-users in North America would prefer 12 VDC. A supply of 12 VDC matched with the inventors' concept for a battery backup system (e.g., using a small lead-acid "alarm" backup battery or a simple deep-cycle battery with a common battery charger) that would allow the regulators to remain powered through brown-outs and short black-outs. With these considerations in mind, the control board was designed to operate on an input voltage range of approximately 8 VDC to 25 VDC. Since the incoming voltage is preferably routed directly to the driver board, the stepper motor was selected to operate specifically on the supply voltage; however, it was decided that all other peripherals and components of the system would receive their necessary voltage by converting the incoming voltage typically provided in the country in which the system would be installed and used. Thus, the board was designed to be ready for both North American and European installations.

Other features designed into the board for "future" growth include (a) an I2C peripheral interface for future expansion and use of additional data that can be obtained from the water line (e.g., real-time water flow rate measurements, water flow totalization, water temp, etc.), (b) a second CAN bus interface for communications on a secondary network (e.g., with the regulator acting as a master device and having slaved peripherals), and (c) a 4 Wire SPI output, which is the outgoing communications port for the feedback device. This 4 Wire SPI output is designed to be used independently of the feedback device, so its serial-to-parallel output capability is designed to be used to drive a large number of digital outputs through specifically designed hardware, as desired. There is also a serial port, which has been used for diagnostics data reporting, and a J-TAG interface for programming and monitoring of the chip through its integrated programming port. All of these peripherals, voltage converters, and interface chips are preferably designed onto a single, two-layer circuit board with all components populated on the top side using surface mount devices to create the most cost effective design.

Variable Position Control Valve

The electrically-controlled valve 730, as shown in FIG. 7B, is an important component of the overall system design and proved to be a significant design challenge. To guarantee a controllable flow, it was necessary to develop a valve assembly that would allow a very small mechanical motion to control a relatively large port, which would then allow for the flow rates that were required, but with the responsiveness needed to create an acceptable regulator. Slow responses would result in large spikes and deep sags as the demand for water fluctuated. The mechanical motion had to be both small so that the valve could respond quickly, but also needed a mechanical force advantage so the valve could be powered with as small an actuator as possible. Since these two criteria interact to oppose one another, a compromise in responsiveness and actuator force had to be determined. Early designs tested, for example, common ball valves, common gate valves, pinch valves—each resulted in a significant seal friction, which made them impractical to control with the low energy and quick reaction speed required for this system. These designs were eliminated from the choices early in the prototyping stage.

Linear motion valve control seemed the best choice to overcome seal friction, so several prototype design ideas were reviewed, including sliding plates, sliding gate, sliding ported cylinders, and simple linear strokes to actuate pivoting type valves. At the top of the list was a linear needle valve with a tapered seat. The concept was prototyped and proved to offer very linear control of the water flow, and it offered low friction in the seats and seals, but the design resulted in a need for a large force to overcome the incoming line pressure of the water supply. The prototype design used a relatively large rod for the needle, so it was finally determined that to overcome the forces due to incoming line pressure, the rod had to be reduced to a size smaller in diameter than that of the outlet port. This change permitted the pressure chamber to become theoretically pressure "neutral" once flow started. This rod is also designed with a self-aligning coupling to further decrease the strain on the stepper motor and, in one embodiment, uses a multi-seal design for redundancy in case of a seal failure.

Figure 9:
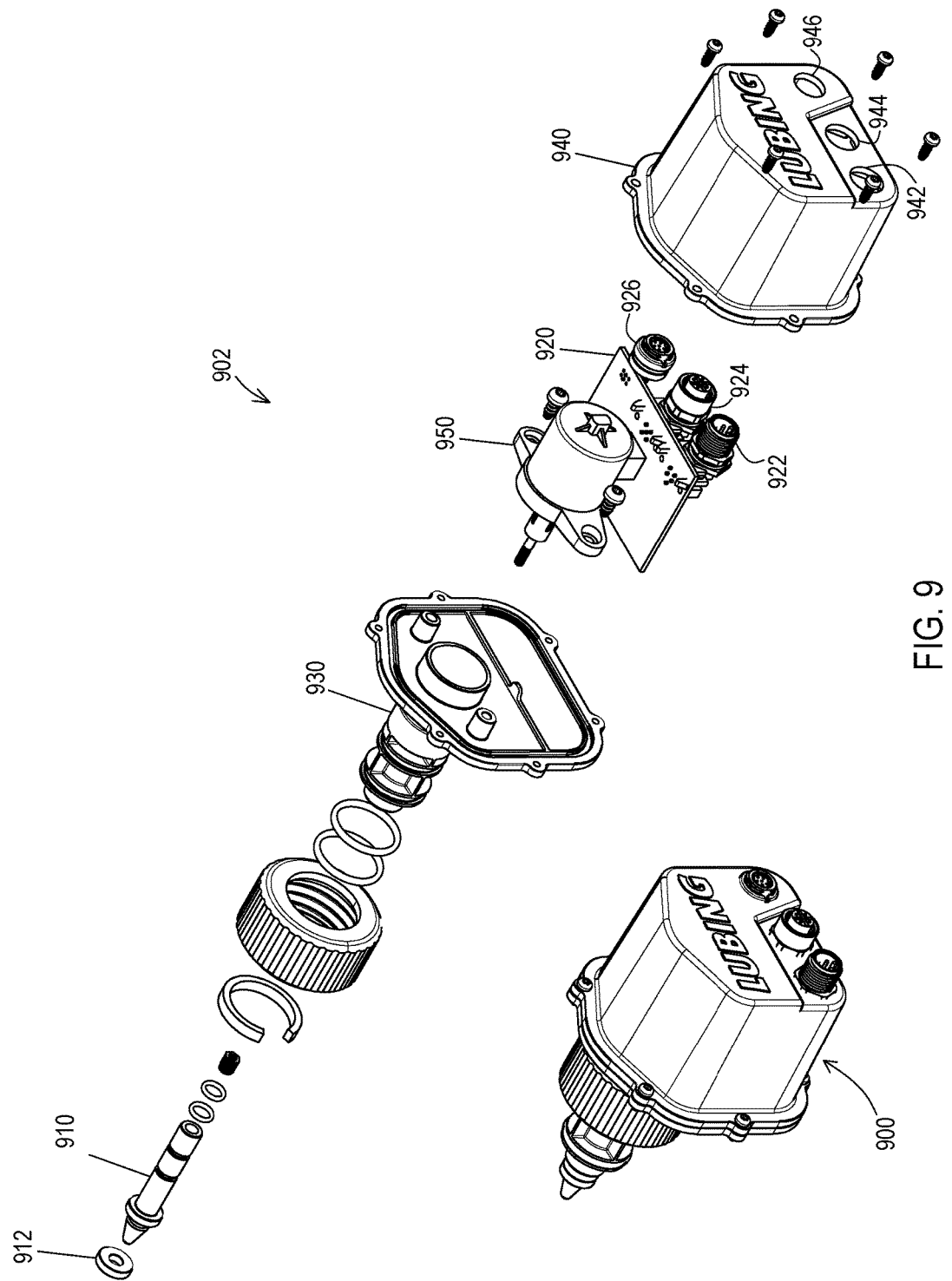
FIG. 9 illustrates both a fully-assembled and an exploded view of a variable position control valve, which is one of the components of the electrically-controlled water pressure regulator of FIGS. 7A and 7B.

The current variable control valve 730 shown in FIG. 7B and described in greater detail herein was born from this prototype. FIG. 9 illustrates the variable control valve 730 in assembled view 900 and in an exploded view 902. The "needle" shape of the actuating part 910 of the valve is accomplished using a simple cone shaped nut. This nut retains a rubber seat or seal 912 to guarantee a positive off when the valve is in a fully-closed position. The tapered seat of the prototype valve was replaced with a simple mating port. This port has a small shoulder that surrounds the port to magnify the forces at the edge of the hole, further ensuring a tight seal when the valve is closed. It is through the combination of the "needle" shaped cone and the matching port size that the variable flow of water through the opening is preferably accomplished. The geometry of the mating seats have been carefully engineered to offer a linear range from extremely low flows, up to full port open. Preferably, the main port seal is field-replaceable without exposing the internals of the assembly to the harsh environment of the facility.

The retrofit capability also lends itself to a simple mechanical bypass in case of a regulator failure. The assembly can be removed from the regulator and replaced with the original (assuming this is a retrofit of a conventional, manual regulator) mechanical flush knob, which allows the regulator to operate in manual mode, if necessary. Also, the regulator preferably maintains its manual adjustment knob, which allows, if desired, a minimum water column height to be set and used as a mechanical fail-safe so that even in the event of a failure, a minimum water pressure and minimum water flow can always be maintained without fear that a power outage or regulator failure might result in causing the flock to die from dehydration.

Electrically the design concept was also challenging. With a low mechanical advantage, the electrical component used to actuate the valve needed to be powerful enough to overcome all of these forces and still be responsive to changes in detected, actual pressure. The first prototype was a high speed DC gear motor with positional feedback on the output controlled in PID closed loop, acting as a servo. The inherent problem with this design was finding enough processor resources to PID control the position of the output and still provide the resources for monitoring water pressure feedback and operating the PID for the control of the pressure. Alternatives were evaluated that would utilize dedicated hardware to control the motor position to off-load the resources from the processor, but the extra hardware costs seemed unfeasible. What finally resulted was a simple, pre-packaged linear stepper. A stepper motor offers independent control of torque and speed, all in an open loop control routine. This frees up the processor, which is installed on a valve circuit board 920, to use its resources to close loop control the pressure, while using an open loop linear actuator to make the necessary adjustments. To ensure that the motor has as much torque and speed as possible, it is driven in a Sine-Cosine step mode with each physical step further reduced electrically into 16 incremental steps. This change gives an increase in stepping performance as well as an increase in positional resolution. To control the stepping functions, the processor incorporates PWM controls in hardware mode. The 16-position Sine-Cosine step algorithm, along with the ability to specify the power level at the motor (from 1% to 100%) required considerable thought in the design of the control. With the PWM features integrated into the processor, the overhead for that portion of the control algorithm is low. However, it is preferable that the processor closely monitor the pressure feedback and make appropriate changes to the position of the valve to adjust the pressure and corresponding flow rate to the drinker line.

With all the tasks that the processor manages, controlling the position of the valve in response to the pressure feedback is the most timing critical. Not only in the sense that it has to be done frequently, but also in the sense that it has to be done rhythmically. It is not acceptable to perform several closely-timed evaluations followed by quick adjustments, and then ignore the task for an extended period of time before coming back to the task and executing it again. This task would require a time-controlled event, which was accomplished through a background task manager spawned by a timed interrupt. In this way, the position of the actuator could be managed asynchronously with the execution of the other tasks in the program, but in a consistently timed fashion. Furthermore, this ensured that the control of these tasks received priority over all others. The other difficult part in the design was how to make adjustments to the output of the motor based on a desired output power level. Since the step design is based on a Sine-Cosine driver, a Sine table was embedded in the processor. The Cosine output was accomplished by shifting the position in the Sine table by a quarter phase to offset the lookup. Depending upon which direction of movement is needed, one H Bridge driver will typically be ahead of the other H Bridge driver by a quarter phase. Shifting directions means the lookup table is referenced moving in the opposite direction. The Sine table is no more than a percentage lookup table. For every lookup position in the table, a second power output table would have the appropriate PWM control register value to accomplish the output desired. At step zero, the Sine output is 0%, so the power lookup table contains a register value in position zero to represent no voltage output to the PWM controller. At step 16, the Sine output is 100%, so the power lookup table contains a register value in lookup position 16 that represents full output voltage to the PWM controller. If the motor power level was something other than 100%, then this power lookup table is recalculated based on the new motor power level. To avoid the risk of a background task, which might occur during the recalculation of the power lookup table, the actual process of recalculating the table was moved to the background task controller as well. Only a change in power would call the routine to update the table, otherwise the stepper motor would use the power lookup table as it was previously calculated. Doing this ensures that the table is fully updated before a new microstep is taken, otherwise one H Bridge may operate at the original power level while the other H Bridge operates at the new power level. Even though this would conceivably only occur for as long as it took the processor to finish the timed interrupt event and then complete the calculations of the table, it was still enough of a concern to make that process part of the background task handler.

The final touch to the control algorithm is an idle mode timer that shuts off the motor driver components if no request for position change is made after a predetermined period of time. This not only helps to control heat build-up in the motor windings and on the control board, but it reduces the overall energy consumption of the system as the motor is easily the single largest electrical load in the system. In a preferred embodiment, if the motor position is stagnant for 100 mS, then all power is removed from the motor windings. Being a rotational stepper motor with an integrated threaded rod to generate the linear motion, external forces cannot alter the position of the motor. In addition, the control board maintains the current position in memory as well as the output power level of each H Bridge driver and immediately upon notification of a step change, the power is restored to the motor windings. This "sleep" mode coupled with a variable torque control technique helps ensure that the lowest level of energy consumption possible while still providing adequate control of the stepper motor.

The motor and control board, along with the "needle" valve assembly, combine to form the variable position control valve. This variable position control valve is retrofitted to the mechanical regulator in the regulator's flush valve assembly port 732, as shown in FIG. 7B. The flush valve assembly port is a large threaded port with a substantial shouldered water inlet at the back of the port to provide the incoming water for the mechanical regulator when it is in its uncontrolled "flush" mode. The size of the water inlet was originally designed and intended to allow for a high volume of water flow to support a drinker line flush. Its design has been fully utilized by the control valve concept to accomplish the electronic regulation of water flow. The substantial size of the water inlet provides an ideal inlet for the control valve with its "needle" valve shape. The threaded flush port provides an ideal means of attachment of the variable position control valve assembly by allowing the flush knob to be unthreaded, and the control valve threaded back into its place. This design feature offers the ability to both control pressure and water flow rate in the watering valve drinker line, as well as to enable unregulated flow when desired to flush the drinker line. The entire retrofit of the variable control valve assembly can typically be accomplished without tools.

Other components of the variable control valve 730 are shown in the exploded view 902 of FIG. 9. Such components include for example, valve housing assembly 930 and valve cover 940. The stepper motor 950 is in electronic communication with the circuit board 920 and is mounted in close proximity thereto. The electrical input 922 and output 924, shown in schematic 800 from FIG. 8, are connected to the circuit board 920. Feedback input 926 corresponds with the feedback input 740 shown in FIG. 7B. The electrical input 922, output 924, and feedback input 926 mount on the circuit board and extend through apertures 942, 944, and 946, respectfully, of the valve cover 940. Other screws, nuts, O-rings, and gaskets used to assemble the variable control valve are also illustrated in FIG. 9.

Diaphragm Pressure Control Mechanism

Figure 10:
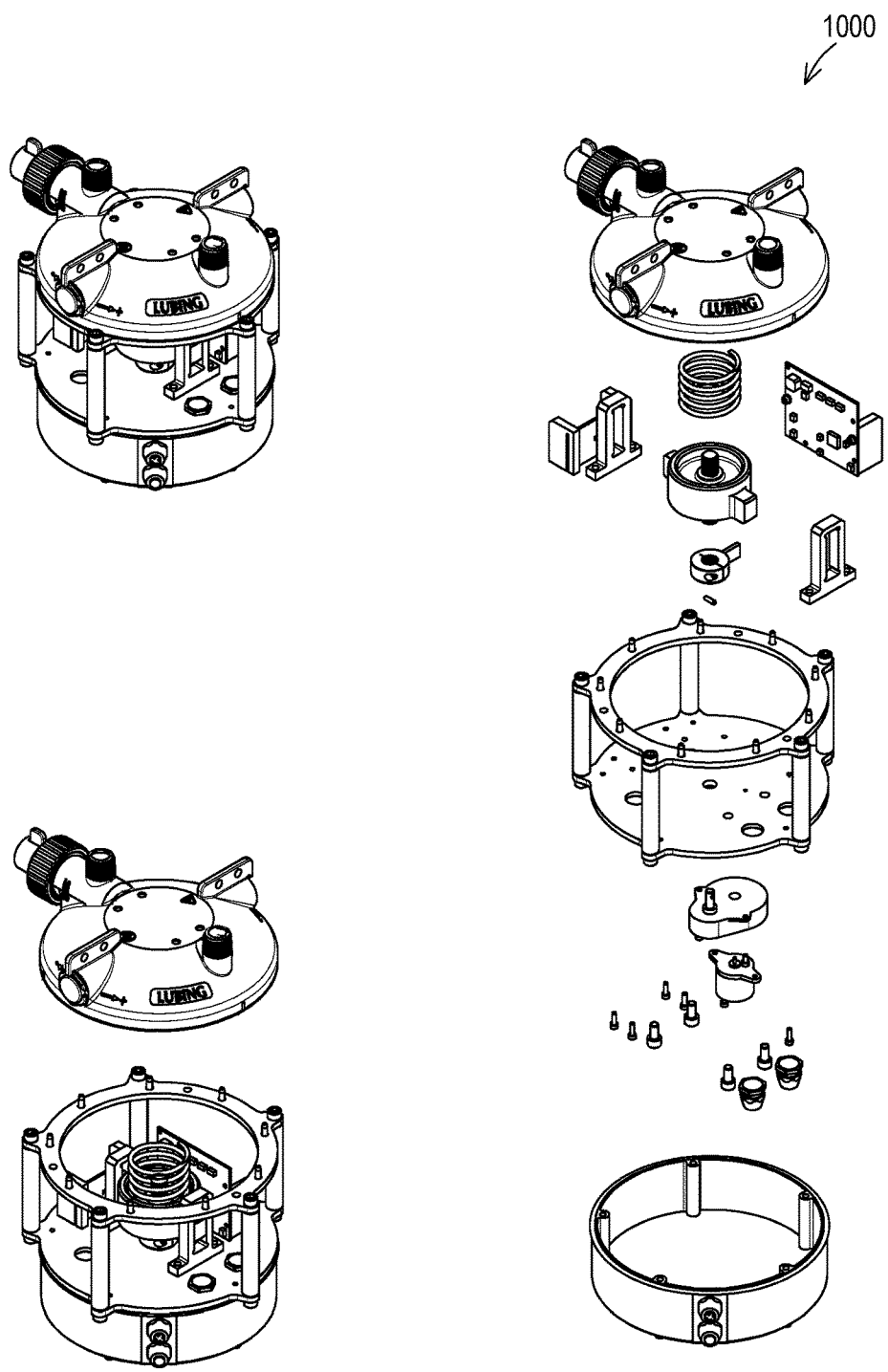
FIGS. 10 and 11 illustrate both fully-assembled and exploded views of two sections of a diaphragm pressure control valve, which is one of the components of the electrically-controlled water pressure regulator of FIGS. 7A and 7B.
Figure 11:
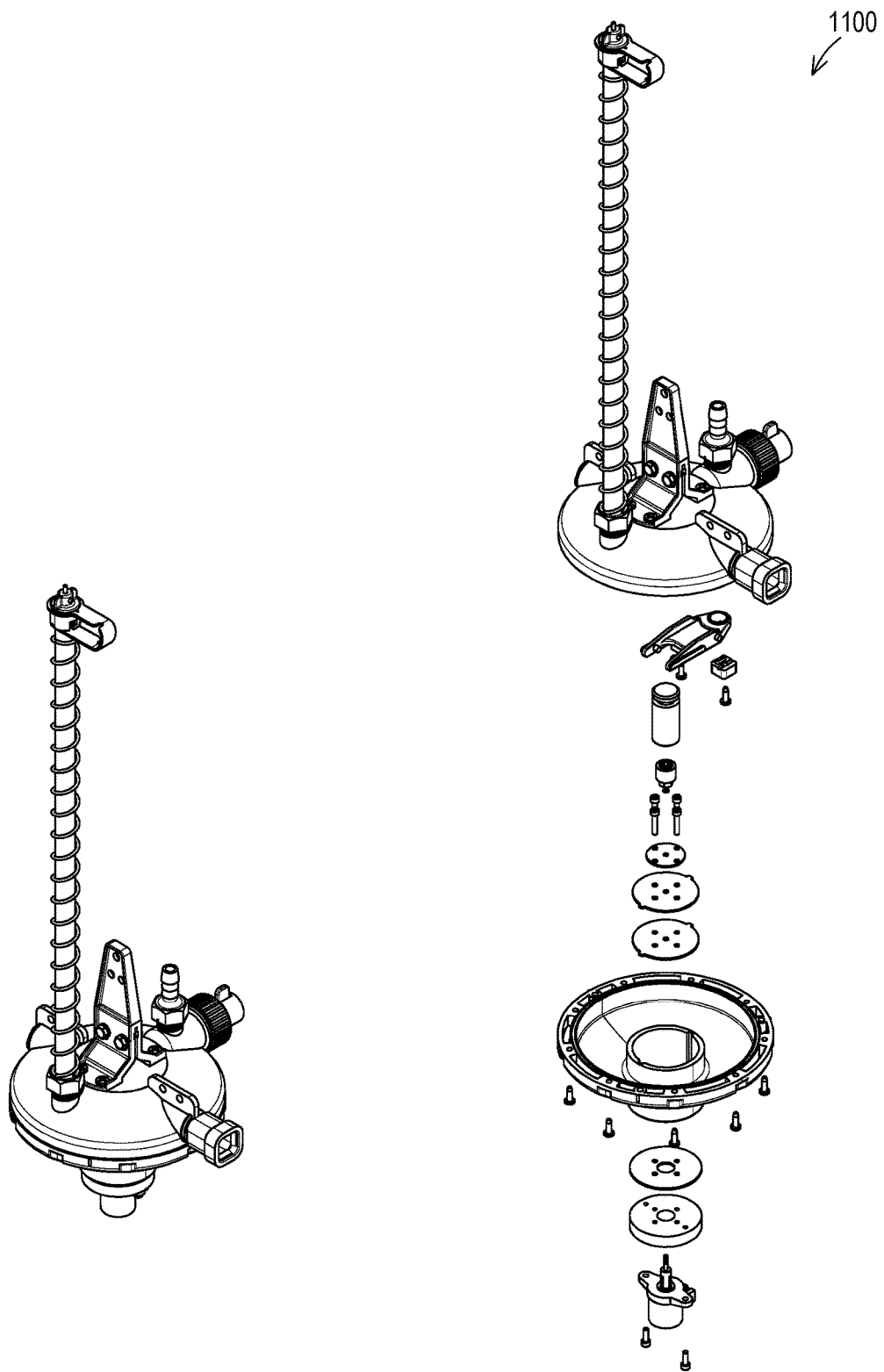

Another method that was explored and that proved to be successful was the diaphragm pressure control mechanism. This assembly requires the removal of the lower portion of a conventional pressure regulator for retrofit installation. An electric motor driven screw is used to change the output water pressure and flow rate out of the regulator by compressing or decompressing a spring in the lower half of the regulator assembly; thus, adjusting pressure on the diaphragm and within the regulator housing. The assembly preferably tracks the position of the motor using a magnetic flag and a Hall effect sensor. FIGS. 10 and 11 illustrate assembled and exploded views of components of the diaphragm pressure control assembly 1000 and 1100.

Pressure Feedback System

The pressure feedback device was difficult mainly due to the desired requirement that it be consistent from device to device, and maintenance-free (or as low maintenance as possible) for the end-user. Preferably, the design should not require calibration or zero offset compensation, and it should not vary based on temperature, device age, or any of the other considerable factors common to analog pressure devices. Furthermore, the pressure range to be monitored, 0 to 24 inches of water column, and the pressure range that the sensor would have to sustain without being damaged during flush, 8 feet of water column or more, made it nearly impossible to find an analog pressure sensor that could meet these requirements and provide the stability and low maintenance required. Many sensors are available for measuring pressure, but none that meet most of these desired requirements—while still being affordable and cost effective. This meant an alternative to an analog pressure sensor had to be found.

The first alternative was a water column gauge. In this category, ultrasonic ranging, microwave, optical displacement, and ultrasonic probes were evaluated, but their cost and bulk made most of them impractical. The first prototype was based on an ultrasonic ranging sensor designed for automotive applications and specifically calibrated to measure water column in a tube. It provided an acceptable measure of error, but was affected by age and environmental temperature. Furthermore, it was slow to respond to rapid changes in level, which made it even less attractive as a measurement device. It was finally decided that it was necessary to build a custom sensor.

The concept was formed by the idea that an array of detectors, arranged in a linear fashion, could be used to locate the water edge, and report the pressure in inches of water column. Two types of sensors seemed likely, an optical and a magnetic field sensor. The optical solution was quickly eliminated due to the probability that the water in the "sight tube" of the regulator could stagnate and darken, affecting the ability of the optics to detect the level. For this reason, the magnetic pickup solution was chosen. Through use of a special float containing a magnet possessing a specific magnetic field, an array of "Hall effect" sensors can be arranged in a linear fashion outside of the water tube to make the necessary measurements of the water pressure while still meeting all of the design criteria for low maintenance, no calibration and zero offset adjustments, capable of sustaining large pressures without being damaged, and have the ability to measure 0-24 inches of water column with a high degree of accuracy with little drift over time and temperature. The only problem with this design is the required number of digital I/O that the concept requires.

What was finally developed was a 26 inch circuit board having 64 Hall effect devices, evenly spaced along the length of the board. Interfacing to the microprocessor is accomplished through a modified serial communication protocol known as 4 Wire SPI. This permits monitoring of the feedback device in lengths in excess of the 24 inches, with a scan rate of over 60 readings per second. Using special algorithms, the system can achieve a resolution of ³⁄₁₆ inch, which is well within the original +/−¼ inch requirement. This sensor array is aligned along the length of the ¾ inch PVC rigid water column tube in a specially designed over-molded housing that protects the circuit from the harsh environment and isolates it from the water source. The sensor array also has two 7-segment displays directly mounted on the circuit board, which are visible from through the over-molded housing. These displays are used to display real time water column level readings as well as doubling to display error codes in the case of a failure. The Hall effect sensor array is designed to sense a flat disc magnet housed in a square float suspended and aligned in the water column tube. Using low current Hall effect devices and driving the display at reduced currents help ensure that the energy consumption is kept low during the operation of the regulator. The magnetic float can be manufactured from high visibility material to serve as an additional visual indicator of water column.

Figure 12:
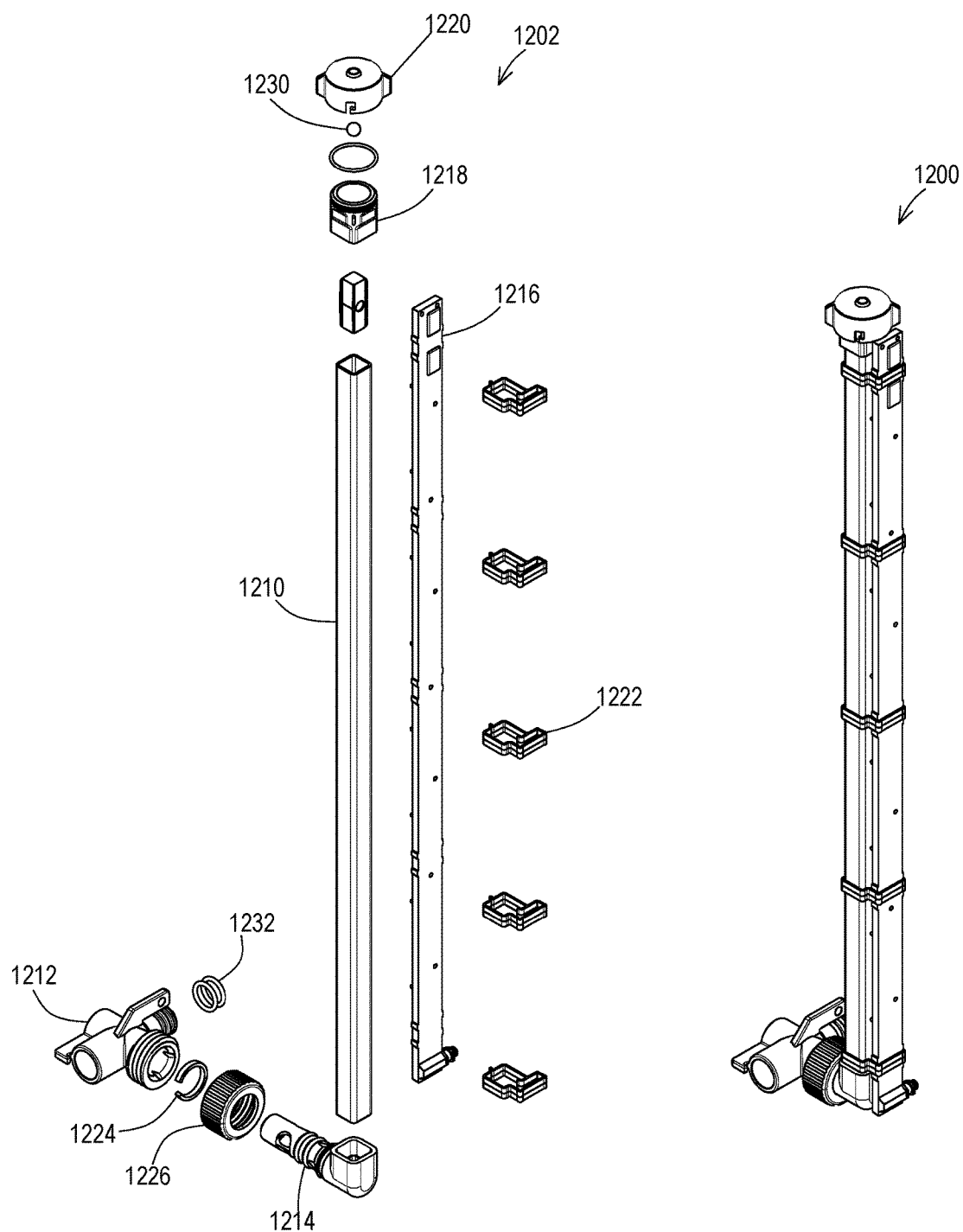
FIG. 12 illustrates both a fully-assembled and an exploded view of a sight tube assembly, which is one of the components of the electrically-controlled water pressure regulator of FIGS. 7A and 7B and is used to provide feedback of the actual water pressure output by the water pressure regulator.

The tube is preferably attached to a 90-degreeelbow connector that is inserted into a custom designed T-fitting and held in place by a nut that is installed on the elbow connector via a retaining ring. The elbow connector has detents that match geometry on the T-fitting, which allows for the water column tube to be rotated when the nut is loosened but locked in place when the nut is tightened. The detents allow for the clear (i.e., see through) water column tube to lock vertical in the operating position, at 45-degrees off of vertical, and at horizontal in the "storage" position. The T-fitting also has an outlet port that is matched to the outlet port on the mechanical regulator, which allows for tube assembly to be used without leaving an outlet port permanently tied up on the mechanical regulator. The assembly is installed on the mechanical regulator by inserting the male end of the T-fitting into either of the two available pressure ports and using a supplied nut and bolt to attach it to the track on the top of the mechanical regulator. All of these attachments can be retrofitted onto the mechanical regulator with only two wrenches to tighten the mounting bolt. All other pieces can typically be assembled by hand. The sight tube is preferably designed to seal during flushing and is easily removable for cleaning and maintenance access. FIG. 12 illustrates assembled view 1200 and exploded view 1202 of components of the water column tube assembly 750, as previously shown in FIGS. 7A and 7B. More specifically, the water tube assembly 750 includes a transparent sight tube 1210 that has a cap base 1218 and a cap 1220. The sight tube 1210 mounts onto a 90-degree fitting 1214. The 90-degreefitting 1214 is connected to a T-fitting 1212, which mounts onto the housing 774 of the water pressure regulator assembly 710, as shown in FIG. 7. An O-ring 1232 fits therebetween. The 90-degree fitting 1214 is connected to the T-fitting 1212 using a holder nut 1226, which includes a split ring 1224 inserted therein. A circuit board 1216 is attached to the sight tube 1210 using connectors or clips 1222. The water pressure within the interior chamber of the housing 774 is measured using a floated magnet assembly 1230 that floats on the water column within the sight tube 1210.

The two concerns with the Hall Effect sensor array concept ended up being cost and the complexity of the mechanical enclosure. As an alternative to the Hall Effect sensor array, a series of discrete capacitive proxes arranged in a linear array, closely mimicking the arrangement of the Hall Effect sensors, was investigated. Such a configuration was determined to be capable of detecting the height of the water column with the tube without requiring a floating magnet. In an alternative embodiment, instead of using multiple discrete proxes, it is possible to use a single prox having a large surface area that is proportionally coupled by the water column. Each of these prox arrangements are nothing more than a thin, preferably flexible, circuit board having copper traces sensitive to capacitive coupling imprinted onto the circuit board with a configured controller chip that manages the capacitive measurements in the traces. More specifically, a series of capacitively coupled conductive traces are imprinted onto an electrical circuit board to sense the presence and absence of water along the length of the circuit board to determine the position of the water column. Through individual discrete values, or combined into a single additive analog value, the measurement of the water column is then able to be converted to an electrical signal and supplied to the control board for calculating the water column height. In another embodiment, it is also possible to use a simple pressure transducer that can is attached to an I2C or ADC interface on the processor and used to measure the water pressure within the interior chamber of the main housing.

Communication Protocol

The communications protocol was one of the last implemented features of the overall system design. Initially, it was thought that all devices would be individually controlled with simple rotary potentiometers that wired directly to each regulator along with the power supply for the device. This very simple approach was direct and easily implemented into the regulator. However, it became obvious that installations of any order of magnitude could require an unreasonably large number of controls. Installations with 50 or more regulators are not uncommon. Using the original concept of one control knob per regulator would require 50 control knobs and 50 wiring pulls, one each from the control enclosure to each of the 50 regulators. Furthermore, having simultaneous manual user interfaces and house automation controller interfaces, which command the same device, would require complicated circuitry or multiple signal pulls to each device. Analog signals could still be used to accomplish the task, but additional circuitry would be needed. Another consideration was that most installations operate multiple regulators at a common pressure level, meaning a single control knob for multiple devices could be a common request. Again, this can be accomplished with analog signals, but concerns with lead length, voltage drops, electrical noise, and output driver capability presented design challenges. With all of these issues in mind, the need for an alternate solution to analog control was added to the invention design objectives. The alternative ultimately chosen was a high level digital network with multiple master, multiple slave capability. The multiple master allows for one or more manual user interfaces to operate alongside of one or more house automation controller interfaces, while multiple slaves allow for one or more devices to be controlled.

Several high level digital network choices were available and already integrated into the microprocessor, including RS232, Ethernet, USB, I2C, and CAN bus, along with others that may be available through use of externally-attached hardware. However, the choice for a multiple master, multiple slave protocol, which best suited the needs of the system turned out to be the CAN bus architecture. There were already a number of industrial automation protocols based on the CAN bus architecture. These networks have generated standardizations that many third party products are designed around, such as wiring, power supplies, network terminators, troubleshooting tools and network analyzers, engineered wiring, and a multitude of other devices, which help to make installation and maintenance of a CAN bus based network simpler and easier to implement than a similarly capable analog control architecture. Furthermore, the CAN bus architecture provided support for nearly 100 devices on a single network, with a maximum network length in excess of 500 meters. Components can be distributed anywhere along this length using simple in/out daisy chain wiring schemes, as shown in FIG. 8. Voltage drops due to long network runs and/or heavy power consumption devices can be managed using distributed power injectors, or power supplies, isolating the power portion of the cabling while maintaining a common communications bus through the entire length of the network. This choice of network solutions also provide the end-user with an already-available market of pre-manufactured cabling, power supplies and other components to make the installation of the control system as easy and as simple as possible. Components are available from multiple manufacturers and can be purchased worldwide from multiple distributors.

The digital network not only provides the ability for multiple point control to multiple devices, but it also allows for multiple channels of control so that several features available within the regulator can be initiated across the same wiring infrastructure. Virtual grouping of devices and multiple point controls are also possible, whether that be a control knob per device or multiple devices per control knob.

Furthermore, devices are now able to communicate back to the controllers with various feedback, such as actual pressure levels, along with several other embedded features. Plus, future add-ons can make even more features available to report back to the control interface. All of these features, with the ability to expand them even further or to mox families of intelligent devices, are all available across a single cable, which implements the CAN bus protocol and power for the devices. Cabling having harsh environment connectors pre-made onto the cable and keyed in such a way that wiring is simple and intuitive to install, even for someone who is not familiar with the system, was chosen. These are the primary benefits of the digital network design implemented into the regulator.

The only true limiting factor of the CAN bus concept described above is the cost of implementation to the end user. Pre-manufactured cabling is available for CAN bus networks, but at a considerable cost, especially when dealing with both power and communications on the same cable. A minimum of four conductors, most likely five when including a grounding conductor, are required, with the communications being a differential pair requiring a twist in the conductor pair. A less expensive alternative, but not "feature implemented" by the processor, would be a form of powerline carrier that distributes power and signal across a minimum of two conductors. When properly designed, such an implementation is not concerned with a twisted pair; thus, reducing the costs of the implementation by a significant magnitude. If communications baud rates are reduced to near audible speeds, the environment and distances of the cabling can be greatly improved, albeit at a compromise in communications speed.

Control Circuitry

The control board is based upon the NXP Arm Core Arm7 processor. The board provides access to essential onboard peripherals, including the CAN bus controller with physical layer implementation, a UART with physical layer implementation, I2C Port with onboard pull-ups for use as a master controller for future optional devices, 4 Wire SPI with both the standard and inverted Select line for interface to the feedback board, stepper motor interface including the high side drive power for control of the metering valve, various status LEDs, and on-board voltage regulators to provide 1.8V, 3.3V, and 6V power from an onboard switching supply that can accept a broad input voltage range (from 8V to 24V) with a nominal efficiency of 93% or greater.

The circuit is preferably a two-layer board construction having only a top and bottom layer with all surface mounted IC components attached to the top side. This design greatly reduced system complexity, simplified construction and testing, and reduced system costs. The JTAG interface facilitates factory programming and quality testing. With a broad voltage input range, the board is designed to operate on common traditional U.S. voltages such as 12 VDC, as well as common European voltages such as 24 VDC. The board can be operated in its entire voltage range without any modifications or settings to the control board. System designs in this voltage range allow for the use of inherently safe, reduced energy, class 2 DC power supplies. This design offers benefits to the end user in terms of safety from accidental shock or fire, and, in some cases, the ability to install the system without special, professional or technical licenses.

The on-board stepper motor interface is designed for efficient installation and operation. An enable line for control of the integrated "stand-by" mode is provided for low power idle operation. The dual "H-Bridge" driver configuration—with its enable, direction, and pulsed output control modes—permits full microstepping control of a single bi-polar stepper motor. The control board is designed to attach directly to the header pin of the linear stepper to reduce wiring requirements, aid in the simplicity of mounting of the board, and provide maximum power through elimination of wire leads to the motor. Furthermore, the design of the board integrated with the motor allows the unit to be configured and installed as a single module, which enhances the modular build retrofit concept of the overall system.

All software is preferably programmed in the C programming language to offer programming familiarity to aide in current and future design enhancements. Development is maintained by a careful system of hardware and software versioning, with each board having "awareness" of the version of software as well as hardware. Product upgrade paths are maintained through use of the integrated JTAG interface, as well as clever use of the integrated communications ports that are provided specifically for future enhancements and device add-ons. Serialized identification numbers ensure distinct IDs on all networks, as well as traceability and version tracking of the device and the product with which it is installed. The control board takes commands and reports status across the primary CAN bus channel. All necessary control algorithms are preferably implemented into the control board, not requiring any externally attached controller for any purpose other than to issue new commands to the control board.

Feedback Circuitry

The feedback board is designed as a pluggable accessory to the control board, completely encapsulated in a protective potting material designed specifically for protection of sensitive electrical components from harsh, damp environments. The feedback board is designed to operate from 0 to 630 mm of water column for measurement of water pressure through use of Hall effect devices, spaced at predetermined locations (preferably, evenly spaced at specified intervals) along the length of the board.

The circuit is preferably a two-layer board construction having only a top and bottom layer with all surface mounted IC components attached to the top side. This design greatly reduces system complexity, simplifies construction and testing, and reduces system costs. Special attention is given to placement of the Hall effect sensors to minimize any interference that might negatively affect their sensitivity to magnetic fields. The Hall effect sensors are preferably arranged along the edge of the feedback board, isolated from the surrounding copper surface and aligned with specifically-positioned through-holes that provide an uninhibited view of the magnetic field from either side of the board. The sensor measurement algorithm is written to provide a 2× resolution multiplier, achieving greater than the minimum requirement of +/−¼ inch. Two integrated 7 segment displays are mounted at the tip of the feedback board to provided system status indication and to aid in field installation, address re-programmability, and provide an alarm/fault indication to the user.

Interface to the control board is preferably accomplished through a slightly modified version of a serial full duplex communications protocol known as 4 Wire SPI. This protocol is supported natively by the microprocessor, so interfacing to the custom built feedback board is accomplished in hardware control of the processor. This considerably reduces the processing power required to communicate with the feedback board. Communications to the Hall effect sensor array is preferably accomplished through use of simple and inexpensive parallel load, serial shift register chips. To adapt these chips to the 4 wire SPI protocol, the SPI control lines from the processor are modified on-board the feedback board to generate the proper timing sequence. The original prototype accomplished this using a simple hex inverter chip, but subsequent designs have been based on a simple BJT—operating as a high speed switch. This significantly reduces the cost and board space requirement for the inversion on the control board. Using the processor's built-in 4 Wire SPI interface, the regulator is able to receive as many as 128 different discrete signals back from the feedback circuit. The custom written algorithms achieve a maximum resolution of 5 mm, which is well within the +/−¼ inch requirement. The design has been tested running at speeds of up to 63 measurements per second. Speeds even greater may be possible, but are not necessary for this implementation or use.

For purposes of illustration, application programs and other executable program components such as the operating system may be illustrated herein as discrete blocks, although it is recognized that such programs and components reside at various times in different storage components of the computing device, and are executed by the data processor(s) of the computer. An implementation of media manipulation software can be stored on or transmitted across some form of computer readable media. Any of the disclosed methods can be executed by computer readable instructions embodied on computer readable media. Computer readable media can be any available media that can be accessed by a computer. By way of example and not meant to be limiting, computer readable media can comprise "computer storage media" and "communications media." "Computer storage media" comprises volatile and non-volatile, removable and non-removable media implemented in any methods or technology for storage of information such as computer readable instructions, data structures, program modules, or other data. Exemplary computer storage media comprises, but is not limited to RAM, ROM, EEPROM, flash memory or memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent system (e.g. expert interference rules generated through a neural network or production rules from statistical learning).

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, mobile phones, softphones, and hand-held devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A water flow regulator for use with a poultry watering system used to provide potable water to a flock of poultry over their growth cycle, the water flow regulator comprising:
   a main housing that defines an interior chamber;
   an input disposed on the main housing and connected to a water supply line, the water supply line providing potable water to the main housing at a first pressure, the input including a metering valve disposed within the interior chamber;
   an output disposed on the main housing and connected to a dispensing line, the dispensing line having a plurality of watering valves configured to supply the potable water to the flock of poultry at a desired flow rate, the desired flow rate optimized to provide a predetermined amount of potable water to the flock through the plurality of watering valves;
   a variable control valve mounted onto the housing and extending into the interior chamber of the housing, the variable control valve positioned to control the flow of potable water into the interior chamber of the main housing and correspondingly through the output, the variable control valve having a needle-shaped cone adapted to engage a mating port within the interior chamber of the main housing and configured to move linearly and incrementally between a fully-closed position and a fully-open position within the metering valve, the variable control valve having a motor that controls the linear and incremental movement of the needle-shaped cone to vary flow rate of the potable water into the interior chamber of the main housing, the motor is in electronic communication with and controlled by a controller board, the controller board being programmed with the desired flow rate for potable water passing through the output to the dispensing lines; and
   a feedback component connected to the main housing, the feedback component configured to provide a feedback signal back to the controller board, the feedback signal corresponding to the actual flow rate of potable water in the dispensing line;
   wherein a comparator component of the controller board receives the feedback signal, determines the actual flow rate of potable water in the dispensing line based on the received feedback signal, and actuates the motor to move the needle-shaped cone linearly and incrementally in the direction necessary to cause the actual flow rate of potable water in the dispensing line to move toward the desired flow rate programmed on the controller board.

2. The water flow regulator of claim 1 wherein the controller board increases the desired flow rate for potable water passing through the output to the dispensing lines over the growth cycle of the flock of poultry.

3. The water flow regulator of claim 1 wherein the motor controls the linear and incremental movement of the needle-shaped cone by rotating a threaded rod connected thereto.

4. The water flow regulator of claim 3 wherein the threaded rod maintains its position and the position of the needle-shaped cone within the metering valve until receiving a signal from the controller board to move.

5. The water flow regulator of claim 1 wherein the comparator component actuates the motor to move the needle-shaped cone linearly and incrementally at predetermined time intervals.

6. The water flow regulator of claim 1 wherein, by varying the flow rate of the potable water into the interior chamber of the main housing, the variable control valve adjusts the potable water within the interior chamber of the main housing to a second pressure and, correspondingly, adjusts the actual flow rate of potable water passing through the output to the dispensing lines.

7. The water flow regulator of claim 6 wherein the feedback component includes a removable tube that is connected to the main housing and receives potable water from the interior chamber.

8. The water flow regulator of claim 7 wherein the feedback component includes a circuit board mounted adjacent the tube, the tube maintaining a column of water having a height, wherein the height of the water column corresponds to the second pressure and wherein the height of the water column is detected by detecting a magnet floating on top of the water column using a plurality of Hall effect sensors mounted along a length of the circuit board.

9. The water flow regulator of claim 7 wherein the feedback component includes a circuit board mounted adjacent the tube, the tube maintaining a column of water having a height, wherein the height of the water column corresponds to the second pressure and wherein the height of the water column is detected using a series of capacitive sensors mounted along a length of the circuit board.

10. The water flow regulator of claim 6 wherein the feedback component includes a removable pressure transducer mounted to the housing that detects the second pressure and generates the feedback signal as a function of the second pressure.

11. A water flow regulator for use with a poultry watering system used to provide potable water to a flock of poultry over their growth cycle, the water flow regulator comprising:
a main housing that defines an interior chamber;
an input disposed on the main housing and connected to a water supply line, the water supply line providing potable water to the main housing at an input pressure, the input including a metering valve disposed within the interior chamber;
an output disposed on the main housing and connected to a dispensing line, the dispensing line having a plurality of watering valves configured to supply the potable water to the flock of poultry at a desired flow rate, the desired flow rate optimized to provide a predetermined amount of potable water to the flock through the plurality of watering valves;
a variable control valve mounted onto the housing and extending into the interior chamber of the housing, the variable control valve positioned to control the flow of potable water into the interior chamber of the main housing and through the output, the variable control valve being in electronic communication with and controlled by a controller board; and
a feedback component mounted onto the main housing, the feedback component configured to detect an actual output pressure of potable water within the interior chamber and to provide a feedback signal to the controller board;
wherein the controller board is programmed with the desired flow rate, the controller board includes a comparator component that receives the feedback signal, determines an actual flow rate of potable water in the dispensing line as a function of the received feedback signal, and actuates the variable control valve to move incrementally between a fully-closed position and a fully-open position within the metering valve as necessary to cause the actual flow rate of potable water in the dispensing line to move toward the desired flow rate programmed on the controller board.

12. The water flow regulator of claim 11 wherein the controller board increases the desired flow rate for potable water passing through the output to the dispensing lines over the growth cycle of the flock of poultry.

13. The water flow regulator of claim 11 wherein the variable control valve includes a needle-shaped cone adapted to engage a mating port within the interior chamber of the main housing and is configured to move linearly between the fully-closed position and the fully-open position within the metering valve, the variable control valve having a motor that controls the linear and incremental movement of the needle-shaped cone to vary flow rate of the potable water into the interior chamber and the corresponding actual output pressure of potable water within the interior chamber.

14. The water flow regulator of claim 13 wherein the motor controls the linear and incremental movement of the needle-shaped cone by rotating a threaded rod connected thereto.

15. The water flow regulator of claim 14 wherein the threaded rod maintains its position and the position of the needle-shaped cone within the metering valve until receiving a signal from the controller board to move.

16. The water flow regulator of claim 13 wherein the comparator component actuates the motor to move the needle-shaped cone linearly and incrementally at predetermined time intervals.

17. The water flow regulator of claim 13 wherein the feedback component includes a removable pressure transducer mounted to the housing that detects the second pressure and generates the feedback signal as a function of the second pressure.

18. The water flow regulator of claim 11 wherein the feedback component includes a removable tube that is connected to the main housing and receives potable water from the interior chamber.

19. The water flow regulator of claim 18 wherein the feedback component includes a circuit board mounted adjacent the tube, the tube maintaining a column of water having a height, wherein the height of the water column corresponds to the actual output pressure and wherein the height of the water column is detected by detecting a magnet floating on top of the water column using a plurality of Hall effect sensors mounted along a length of the circuit board.

20. The water flow regulator of claim 18 wherein the feedback component includes a circuit board mounted adjacent the tube, the tube maintaining a column of water having a height, wherein the height of the water column corresponds to the actual output pressure and wherein the height of the water column is detected using a series of capacitive sensors mounted along a length of the circuit board.

* * * * *